(12) United States Patent
Liu

(10) Patent No.: US 6,507,830 B1
(45) Date of Patent: Jan. 14, 2003

(54) RETRIEVAL SYSTEM, RETRIEVAL METHOD AND COMPUTER READABLE RECORDING MEDIUM THAT RECORDS RETRIEVAL PROGRAM

(75) Inventor: Shaoming Liu, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/433,873

(22) Filed: Nov. 4, 1999

(30) Foreign Application Priority Data

Nov. 4, 1998 (JP) .......................................... 10-313083

(51) Int. Cl.$^7$ .............................................. G06F 17/30
(52) U.S. Cl. .................. 706/48; 706/6; 707/3; 707/4; 707/5
(58) Field of Search ............................... 706/48, 45, 12

(56) References Cited

U.S. PATENT DOCUMENTS 6,338,062 B1 * 1/2002 Liu ................................ 707/3

FOREIGN PATENT DOCUMENTS

| JP | 6-251156 | 9/1994 |
| JP | 7-28844 | 1/1995 |
| JP | 02000099632 | * 4/2000 |
| JP | 02000137732 A | * 5/2000 |

* cited by examiner

Primary Examiner—Thomas Black
Assistant Examiner—Joseph P. Hirl
(74) Attorney, Agent, or Firm—Oliff & Berridge, PLC

(57) ABSTRACT

A retrieval system enables high-speed and high-precision pattern retrieval. A retrieval dictionary generation unit classifies learned patterns into plural clusters, and generates a retrieval dictionary using the clusters. A nearest cluster detector detects, a cluster nearest to an input retrieval patter from among clusters in a multidimensional space. The specific space is generated between a couple of spheres having radiuses smaller and larger, respectively, than a distance from a central cluster that locates near the center of the multidimensional space to the retrieval pattern. A learned pattern detector compares all learned patterns that belong to the nearest cluster with the retrieval pattern and detects a learned pattern at predetermined distance from the retrieval pattern. A retrieval range decision unit decides a retrieval range using the learned pattern detected by the learned pattern detector and retrieval pattern.

21 Claims, 18 Drawing Sheets

FIG. 16

| | | | | | | | | | | | |
|---|---|---|---|---|---|---|---|---|---|---|---|
| 251st CLASS | 搬 | 撤 | 撒 | 繊 | 織 | 轍 | 敵 | 嘘 | | | |
| 252nd CLASS | 板 | 坂 | 敗 | 致 | 敢 | 故 | 版 | | | | |
| 253rd CLASS | 煩 | 須 | 項 | 頃 | | | | | | | |
| 254th CLASS | 番 | 呑 | 香 | 昏 | 菅 | 管 | 彎 | 唇 | 骨 | | |
| 255th CLASS | 庇 | 底 | 在 | 註 | 荘 | 虹 | 紅 | 粧 | | | |
| 256th CLASS | 泌 | 派 | 泥 | 添 | | | | | | | |
| 257th CLASS | 疲 | 疫 | 疾 | 症 | 庄 | 座 | 度 | | | | |
| 258th CLASS | 肥 | 犯 | 妃 | 紀 | 短 | 矩 | 距 | | | | |
| 259th CLASS | 琵 | 琶 | 毘 | 昆 | 器 | 親 | 規 | 祝 | 視 | 現 | 硯 |
| 260th CLASS | 眉 | 届 | 屈 | 周 | 局 | | | | | | |
| 261st CLASS | 匹 | 匠 | 区 | 旺 | | | | | | | |
| 262nd CLASS | 疋 | 足 | 冗 | | | | | | | | |
| 263rd CLASS | 彦 | 鳶 | 森 | 京 | 哀 | 套 | 査 | 庭 | 塵 | 鹿 | 直 | 喪 |
| | 姦 | 嘉 | 巌 | | | | | | | | |
| 264th CLASS | 菱 | 麦 | 斐 | 受 | 愛 | 舜 | 脅 | 黍 | 委 | 翁 | |
| 265th CLASS | 弱 | 粥 | 照 | 晒 | 咽 | | | | | | |
| 266th CLASS | 氷 | 水 | 求 | 永 | | | | | | | |
| 267th CLASS | 品 | 晶 | | | | | | | | | |
| 268th CLASS | 抗 | 斌 | 坑 | 帆 | 机 | 肌 | 航 | 杭 | | | |
| 269th CLASS | 浜 | 汎 | 沢 | 混 | 況 | | | | | | |
| 270th CLASS | 瓶 | 然 | 肱 | 紘 | 虻 | | | | | | |

RETRIEVAL SYSTEM, RETRIEVAL METHOD AND COMPUTER READABLE RECORDING MEDIUM THAT RECORDS RETRIEVAL PROGRAM

BACKGROUND OF THE INVENTION

1. Field of the Invention

The present invention relates to a retrieval system, a retrieval method and a computer readable recording medium that records a retrieval program, particularly relates to a retrieval system that executes pattern retrieval, a retrieval method of executing pattern retrieval and a computer readable recording medium that records a retrieval program that instructs a computer to execute pattern retrieval.

2. Description of the Related Art

Technology for pattern retrieval and structure retrieval means technology for retrieving the pattern of a character, voice and an image, compound molecular structure, RNA secondary structure and others using a computer, and a demand for higher-speed and higher-precision retrieval is arising as diversified and complicated computerized society has developed in recent years.

The retrieval of the most similar pattern or structure may be demanded in addition to the retrieval of a pattern or structure completely coincident.

For example, in the field of information chemistry, the issue of structure and activity that the property may be similar if the structure of compounds is similar has been researched from long ago and in such a case, there is a strong demand for efficiently classifying millions of compound molecular structures and efficiently retrieving similar structure.

In the field of pattern retrieval, a round robin retrieval method is known that distance or similarity between patterns is defined using their features, and a retrieval pattern is estimated by comparing an input-unknown pattern (hereinafter called a retrieval pattern) with all retrieved patterns (hereinafter called a learned pattern) using the above distance or similarity.

However, in the above round robin retrieval method, as it requires so much labor to calculate distance or similarity between patterns, there is a serious defect that it requires considerable time to compare with a large number of learned patterns.

Therefore, heretofore, a rough classification retrieval method has been widely used that distance between learned patterns is calculated beforehand, learned patterns are classified into some clusters and retrieval is made.

For example, in Japanese Published Unexamined Patent Application No. Hei 6-251156, the nearest cluster is acquired by classifying learned patterns into some clusters using distance between the patterns and comparing a retrieval pattern with the representative of each cluster, while converting the feature of the retrieval pattern.

A retrieval pattern is estimated by comparing all the learned patterns that belong to the acquired cluster with the retrieval pattern.

In the meantime, in the field of information chemistry, if the similar molecular structure or the partially similar molecular structure to designed molecular structure is retrieved when a new compound is synthesized, it comes into question how distance or similarity between compound molecular structures should be defined, how a compound molecular structure should be represented, how a compound should be classified and how a similar structure should be retrieved.

In Japanese Published Unexamined Patent Application No. Hei 7-28844, distance between structures is calculated by representing the solid structure of a substance by a point set and overlapping two solid structures. A similar structure is retrieved by narrowing down proposed structures depending upon geometric relationships and reducing a retrieved range.

However, in the above conventional type rough classification retrieval method, there is a problem that retrieval precision is bad though retrieval speed is fast.

FIGS. 18A and 18B show the problem of the rough classification retrieval method in relation to precision. FIG. 18A shows a case that clusters are overlapped and FIG. 18B shows a case that clusters are not overlapped.

Suppose that in retrieval shown in FIG. 18A, a cluster A is first acquired as a cluster distance between an input pattern q and the representative of which is the minimum (that is, D1<D2 as shown in FIG. 18A).

Distance between each of plural learned patterns in the cluster A and the input pattern q is compared. Then, a learned pattern a located at the minimum distance d1 is acquired as a similar pattern.

However, while distance between the input pattern q and the cluster representative is larger in a cluster B than in a cluster A, distance d2, which is the distance from a learned pattern b, is smaller than distance d1. That is, the learned pattern b is actually a pattern the most similar to the input pattern q.

Also in the case of FIG. 18B, distance D1 between a retrieval pattern q and the representative of the cluster A is smaller than distance D2 between the retrieval pattern q and the representative of the cluster B, however, a pattern the most similar to the retrieval pattern q is not the learned pattern a but is actually the learned pattern b in the cluster B (d2<d1).

Therefore, there is a problem that retrieval precision in the rough classification retrieval method strongly depends upon the definition and a calculation method of distance between learned patterns, a method of representing a learned pattern itself and a method of classifying learned patterns into any cluster, and the secure retrieval of the most similar pattern is not guaranteed.

Also, in the above related art, the enhancement of precision is tried by converting the feature of an input pattern and utilizing the characteristics of the solid structure of a substance, however, in any case, since retrieval precision depends upon the distance, a representation method and a classification method of a pattern, the reliability of retrieval precision has not been sufficiently high.

SUMMARY OF THE INVENTION

The present invention is made in view of these points and provides a retrieval system that executes high-speed and high-precision retrieval without depending upon the distance, a representation method and a classification method.

The present invention also provides a retrieval method for enabling high-speed and high-precision retrieval without depending upon the distance, a representation method and a classification method.

Further, the present invention also provides a computer readable recording medium that records a retrieval program for executing high-speed and high-precision retrieval without depending upon the distance, a representation method and a classification method.

In order to solve the above problems, the retrieval system has a retrieval dictionary generation unit that classifies learned patterns into plural clusters, and generates a retrieval dictionary using the clusters, and a nearest cluster detector that, based on clusters in a space between a couple of spheres having radiuses smaller and larger, respectively, than a distance from a central cluster that locates near the center of a multidimensional space to an input retrieval pattern, detects a cluster nearest to the retrieval pattern from among the clusters in the multidimensional space utilizing the retrieval dictionary. The system also has a learned pattern detector that compares each of learned patterns belonging to the nearest cluster with the retrieval pattern and detects a learned pattern at a predetermined distance from the retrieval pattern, a retrieval range decision unit that decides a retrieval range using the learned pattern detected by the learned pattern detector and the retrieval dictionary, and a retrieval unit that retrieves the retrieval pattern among the learned patterns in the retrieval range.

BRIEF DESCRIPTION OF THE DRAWINGS

The invention will be described with reference to the following drawings, wherein like numerals designate like elements, and wherein:

FIG. 16 shows a part of character pattern clusters;

FIG. 18A shows a case that clusters are overlapped and FIG. 18B shows a case that clusters are not overlapped.

DESCRIPTION OF THE PREFERRED EMBODIMENT

Figure 1:
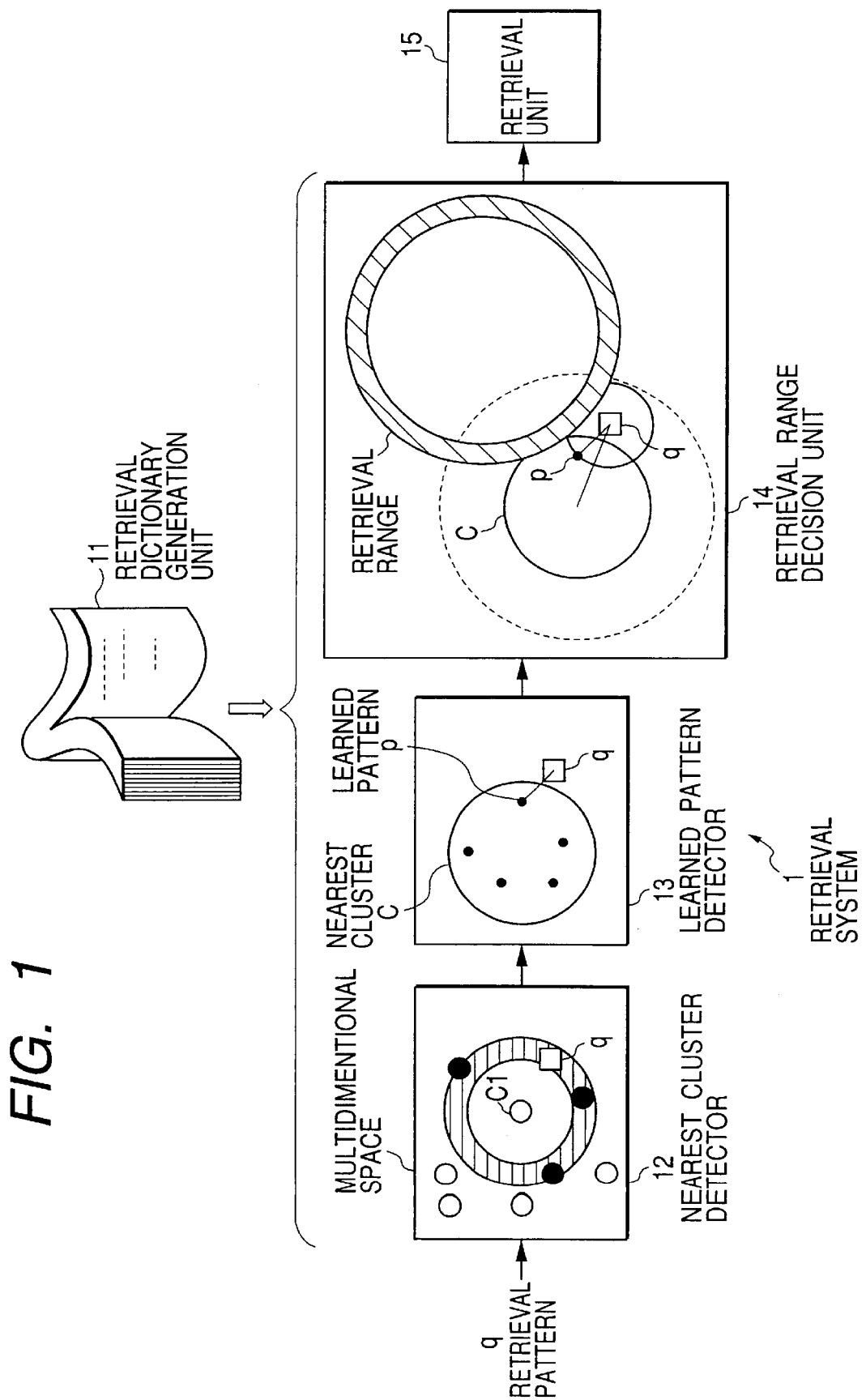
FIG. 1 shows the principle of a retrieval system according to the present invention.

Referring to the drawings, an embodiment of the present invention will be described below. FIG. 1 shows the principle of a retrieval system according to the present invention. The retrieval system 1 executes pattern (including structure) retrieval and similar pattern retrieval.

The retrieval dictionary generation unit 11 classifies learned patterns into plural clusters based upon information such as distance as a scale for showing difference in structure or a property between patterns or similarity as a scale showing how patterns are similar and others, and generates a retrieval dictionary using the above clusters. The details of the retrieval dictionary will be described later.

The nearest cluster detector 12 detects, based on clusters in a specific space (black circles in the figure), a cluster nearest to an input retrieval pattern q from among clusters in a multidimensional space utilizing the retrieval dictionary. The space is specified between a couple of spheres having radiuses smaller and larger, respectively, than a distance from a central cluster C1 that locates near the center of the multidimensional space to the retrieval pattern q.

The learned pattern detector 13 detects a learned pattern p located at predetermined distance (hereinafter called the minimum distance) from the retrieval pattern q by comparing all the learned patterns that belong to the nearest cluster C with the retrieval pattern q.

The retrieval range decision unit 14 decides a retrieval range using the learned pattern p detected by the learned pattern detector 13 and the retrieval dictionary.

That is, the retrieval range decision unit decides a retrieval range (a part having oblique lines in FIG. 1) using the distance between the learned pattern p and the retrieval pattern q, the distances between clusters and the radiuses of clusters stored in the retrieval dictionary. The details will be described later.

The retrieval unit 15 executes the pattern retrieval and the similar pattern retrieval of the retrieval pattern q from among all the learned patterns that belong to the retrieval range.

Figure 2:
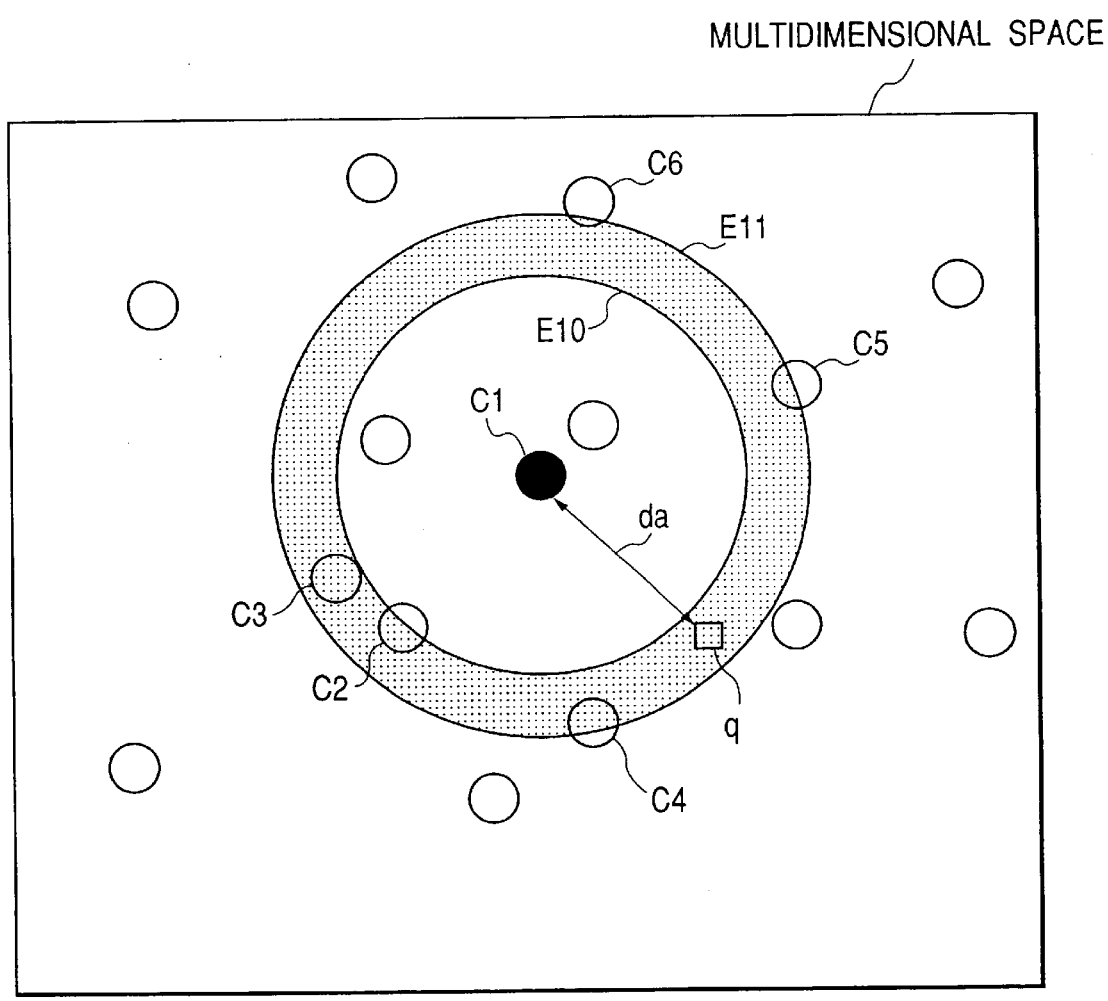
FIG. 2 explains the operation of a nearest cluster detector.
Figure 3:
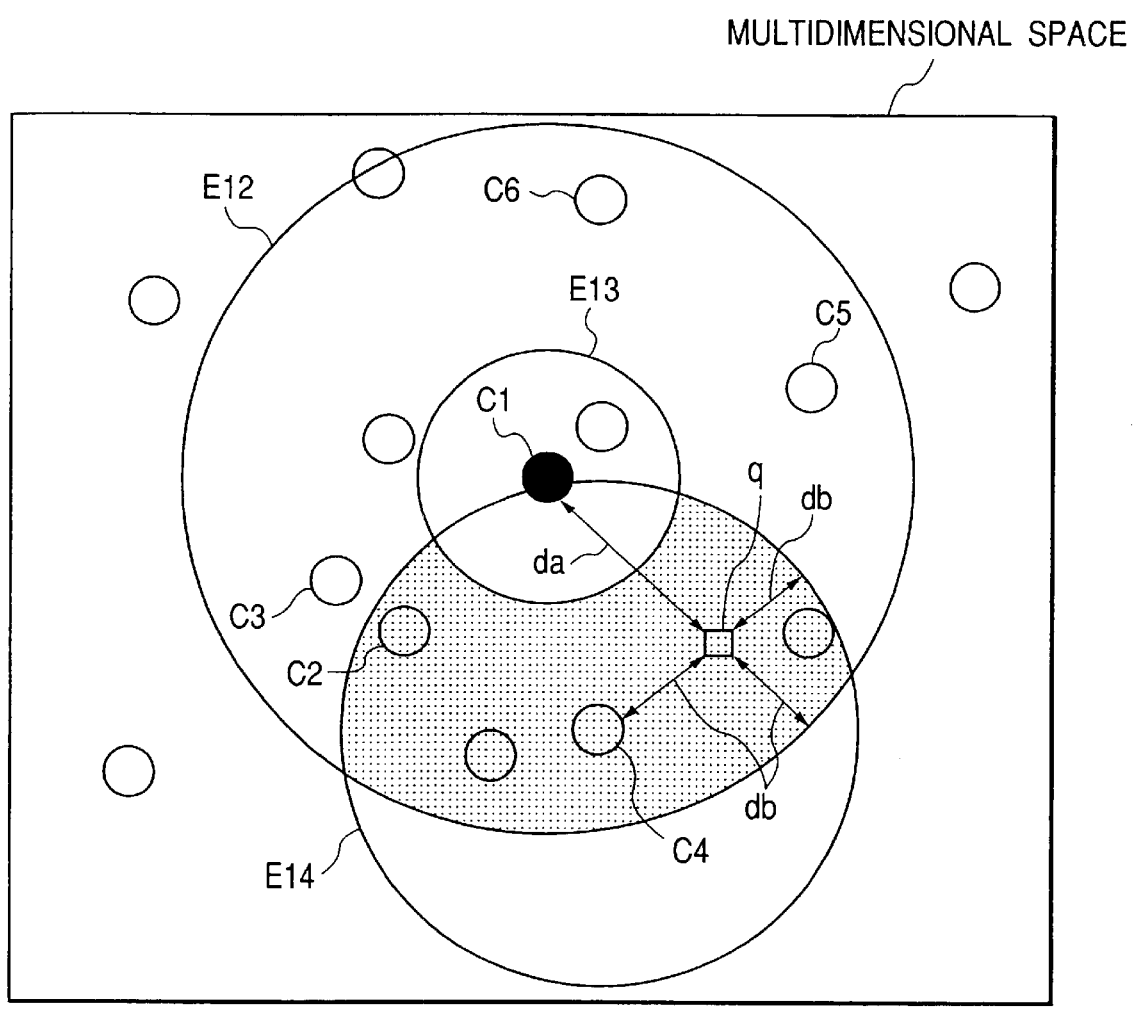
FIG. 3 explains the operation of the nearest cluster detector.

Next, the outline of the operation of the retrieval system 1 will be described. FIGS. 2 and 3 explain the operation of the nearest cluster detector 12.

Plural clusters and the retrieval pattern q are shown in a multidimensional space in FIG. 2. First, the distance da between a cluster C1 located in the center of the multidimensional space and the retrieval pattern q is obtained. A specific space is generated between a couple of spheres having radiuses smaller and larger, respectively, than the distance da (a detailed procedure for generating the specific space will be described later) and clusters in the space, that is, clusters which are inside or in contact with borders of the space are obtained. In the figure, clusters in the space are assigned cluster numbers C2 to C6.

The distances between the clusters in the specific space and the retrieval cluster q are compared. In this case, it is recognized that the cluster C4 is nearest to the retrieval pattern q.

If no cluster exists within a specific space set first, the space is gradually widened until clusters are made to be included in the space. Specifically, the radius of a sphere E10 is reduced and the radius of a sphere E11 is enlarged.

FIG. 3 shows a midway process of narrowing down a cluster comparison range. A cluster comparison range is narrowed down based upon the cluster C4 obtained in FIG. 2.

First, excluded from a comparison range are clusters outside a sphere E12 (its center is C1) having a radius of (da+db), where da is the distance between the central cluster C1 and the retrieval pattern q and db is the distance between the cluster C4 and the retrieval pattern q.

Also, clusters inside a sphere E13 with the cluster C1 at center whose radius is (da−db) are excluded from a comparison range. Clusters inside a sphere E14 with the cluster C4 at center whose radius is (2*db) are selected. That is, a dotted area as shown in the figure is a cluster comparison range.

Further, within the comparison range, a cluster nearest to the retrieval pattern q is obtained, and the operation described in FIG. 3 is repeated until a cluster nearest to the retrieval pattern q is finally detected.

As described above, to detect the nearest cluster, from among clusters in the space specified between the couple of spheres having radiuses smaller and larger, respectively, than the distance between the central cluster C1 and the retrieval pattern q, a cluster (the cluster C4 in the above example) nearest to the retrieval pattern q is obtained, and based upon the cluster, a cluster comparison range is set.

Thereby, in comparison with a method which, without obtaining clusters in the specific space, from the beginning, sequentially compares a retrieval pattern q with plural clusters in ascending order by the distance between a central cluster C1 and the retrieval pattern q, the present invention enables faster detection of a cluster nearest to the retrieval pattern q.

Figure 4:
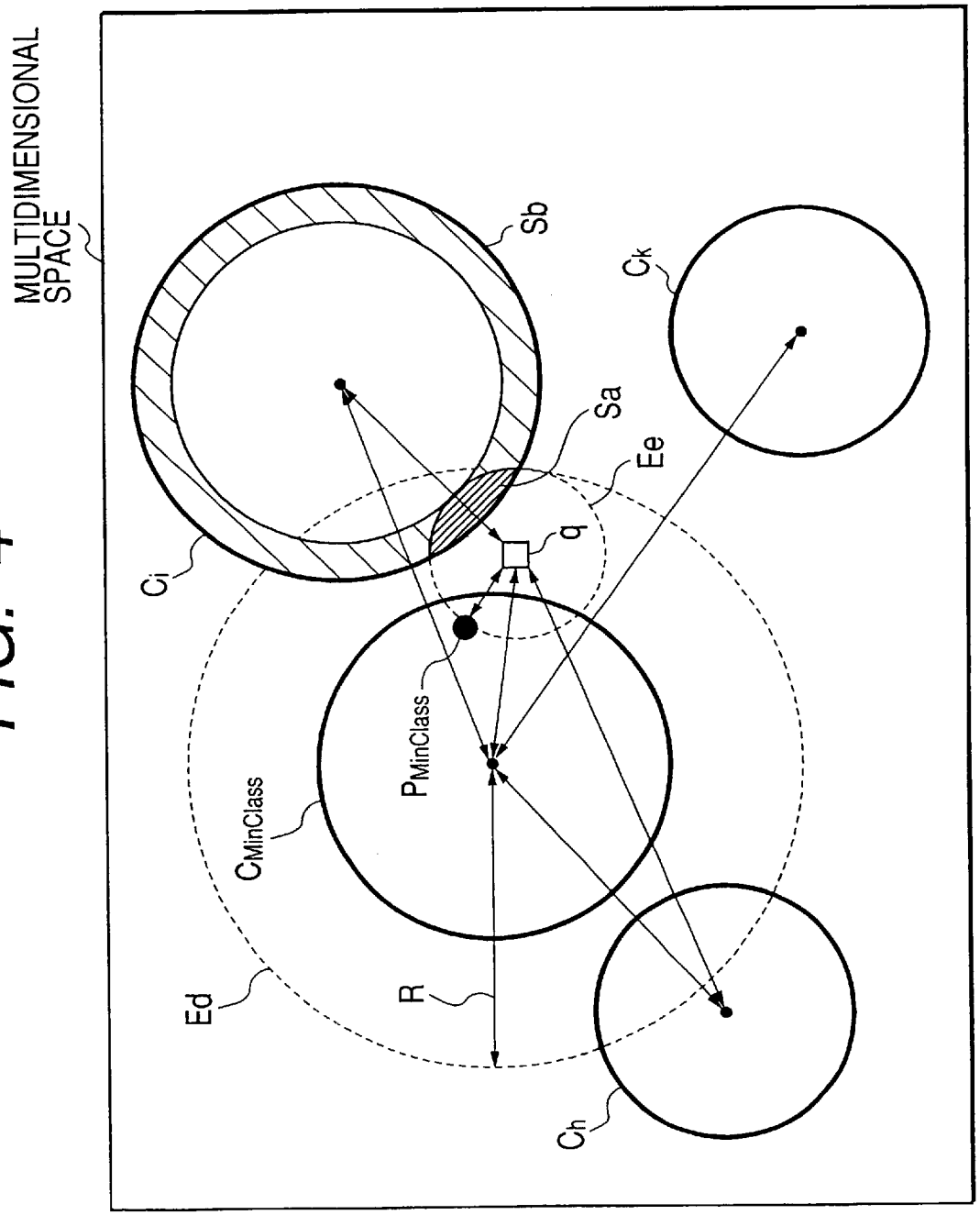
FIG. 4 explains the operation of a learned pattern detector and a retrieval range determining unit.

Next, the operation of the learned pattern detector 13 and the retrieval range decision unit 14 will be described. FIG. 4 explains the operation of the learned pattern detector 13 and the retrieval range decision unit 14.

After the nearest cluster $C_{MinClass}$ is obtained, the learned pattern detector 13 compares the retrieval pattern q with all the learned patterns that belong to the nearest cluster $C_{MinClass}$ and obtains a learned pattern $P_{MinClass}$ distance between which and the retrieval pattern is the minimum.

A sphere Ed (its center is the representative of the cluster $C_{MinClass}$) being having a radius R composed of the distance between the cluster $C_{MinClass}$ and the retrieval pattern q and the distance between the learned pattern $P_{MinClass}$ and the retrieval pattern q obtained by the learned pattern detector 13 is also obtained.

Next, the retrieval range decision unit 14 checks to see whether a cluster overlapped with the sphere Ed exists or not. As information required for retrieval such as distance between clusters is stored in the retrieval dictionary, it is already known.

Therefore, the retrieval range decision unit can determine that a cluster $C_k$ is not overlapped with the sphere Ed as shown in FIG. 4 and is outside the retrieval range. The retrieval range decision unit also recognizes that a cluster $C_h$ is overlapped with the sphere Ed.

The retrieval range decision unit 14 next checks to see whether or not a cluster overlapped with a sphere Ee (having a radius equivalent to distance between the retrieval pattern q and the learned pattern $P_{MinClass}$) exists. As the cluster $C_h$ is not overlapped with the sphere Ee though the cluster is overlapped with the sphere Ed, the retrieval range decision unit determines that the cluster $C_h$ exists outside a retrieval range and selects a cluster $C_i$ overlapped with the spheres Ed and Ee.

Figure 5:
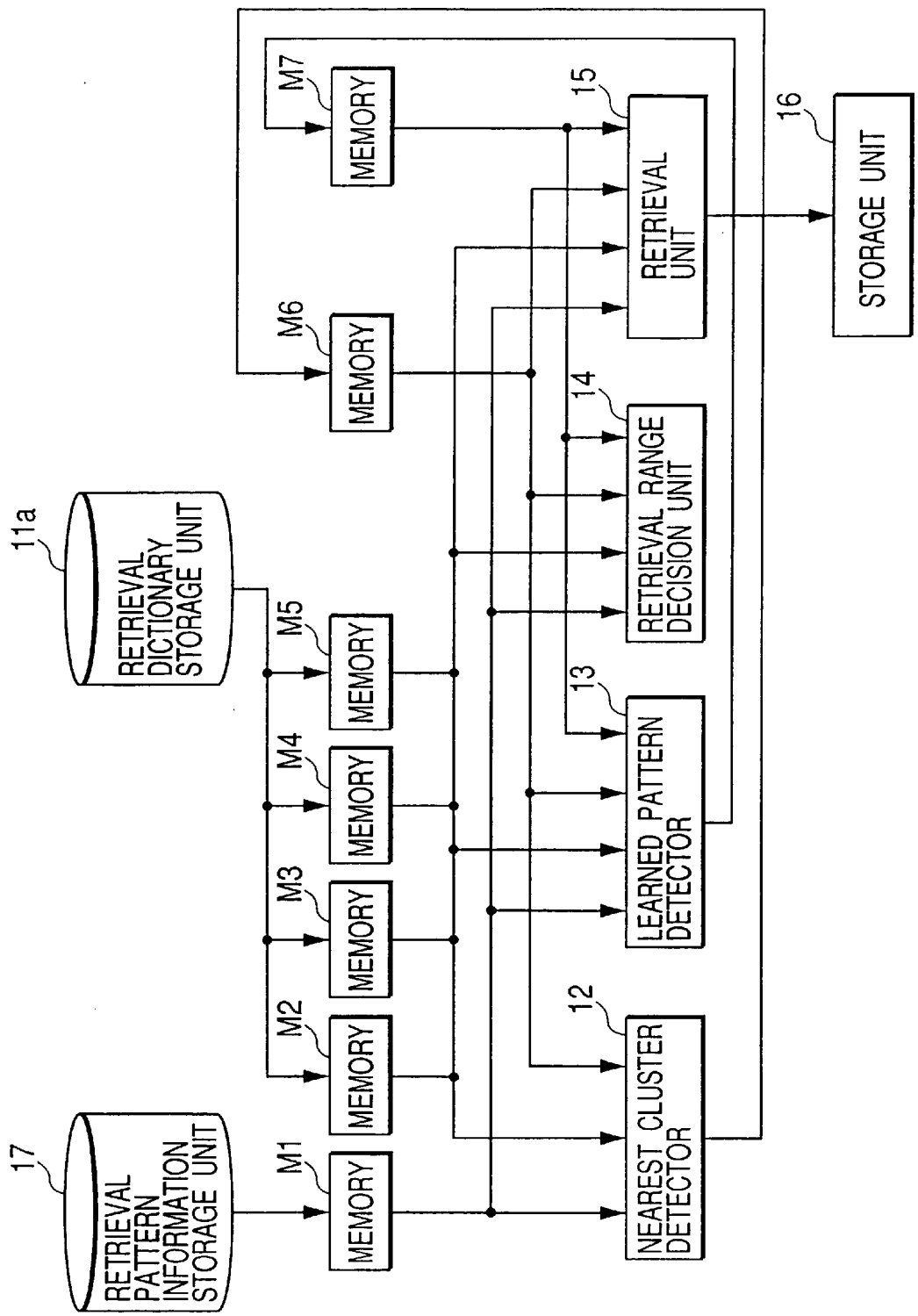
FIG. 5 shows the configuration of the retrieval system.

The area of the cluster $C_i$ overlapped with the sphere Ee is only an area Sa, however, as a pattern arranged in multidimensional space is considered, a part Sb having oblique lines including the area Sa and shown in FIG. 5 is obtained as a final retrieval range.

Afterward, the retrieval unit 15 retrieves the retrieval pattern q from among all the learned patterns that belong to the retrieval range Sb. The algorithm of operation such as the detection of the nearest cluster and the decision of a retrieval range will be described in detail later using mathematical formulae.

As described above, in the retrieval system 1 according to the present invention, the retrieval dictionary is generated beforehand, the nearest cluster to an input retrieval pattern is detected based upon the retrieval dictionary, and a learned pattern which belongs to the nearest cluster and is the closest to the retrieval pattern is detected.

A retrieval range is gradually decided using the detected learned pattern and the retrieval dictionary and retrieval is executed in a finally obtained retrieval range.

Therefore, since retrieval is not executed depending upon the definition of distance between patterns, a method of calculating it, a method of representing a pattern and a method of classifying patterns into clusters respectively set as heretofore, retrieval speed and retrieval precision are enhanced and reliable retrieval is enabled.

Figure 6:
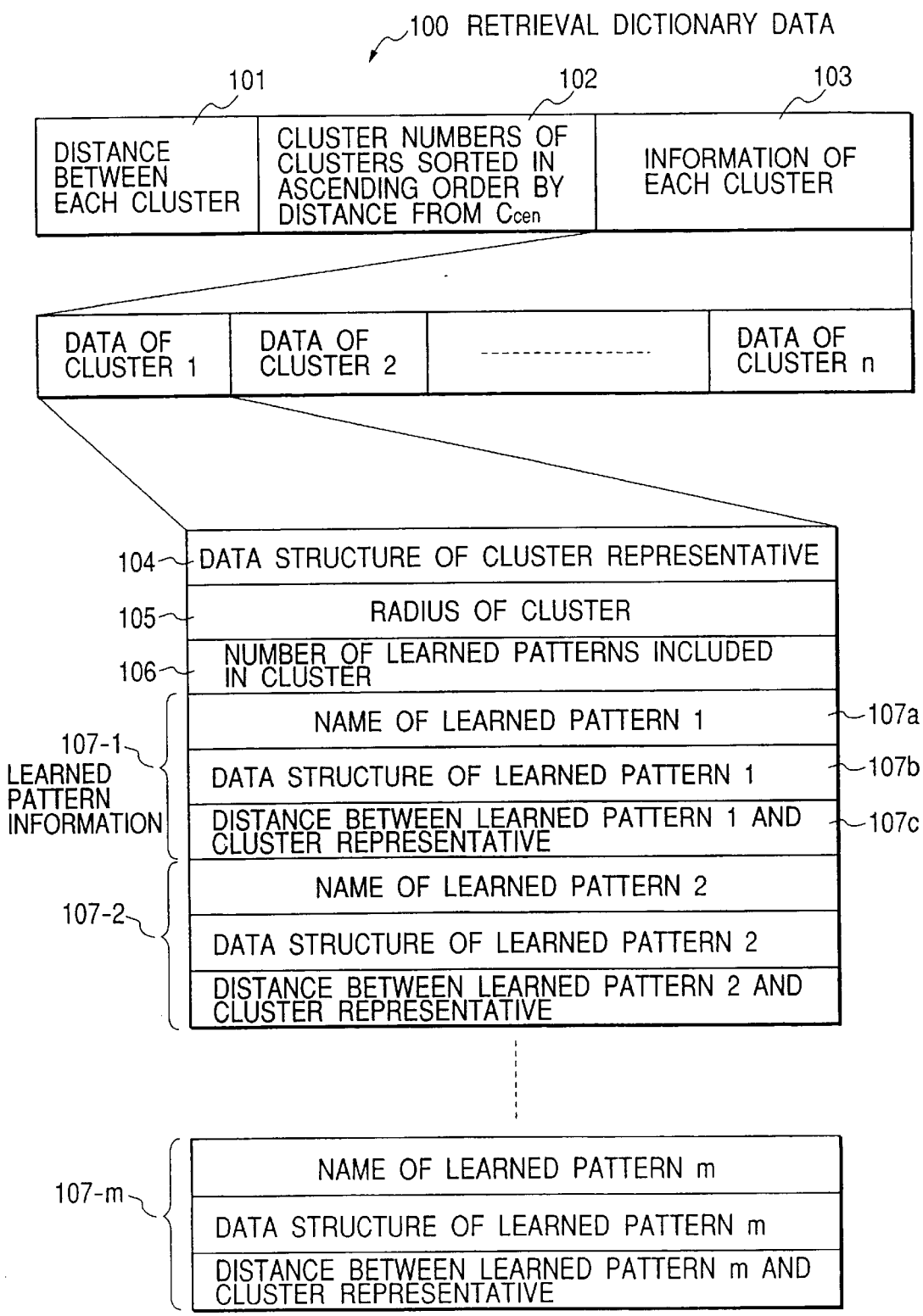
FIG. 6 shows the retrieval dictionary data in a retrieval dictionary.

Next, referring to FIGS. 5 and 6, the detailed configuration of the retrieval system 1 according to the present invention will be described. FIG. 5 shows the configuration of the retrieval system 1.

A retrieval pattern information storage 17 stores the information of retrieval patterns. The information of retrieval patterns is composed of the name and the data structure of the retrieval pattern.

The data structure of a pattern is different depending upon a method of representing a pattern. For example, if a pattern is represented based upon its feature, the feature is stored as the data structure of the pattern.

If a pattern is represented by a graph in graph theory, a weighted graph corresponding to the pattern is stored as the data structure of the pattern. A pattern itself may also be stored as the data structure of the pattern.

The retrieval dictionary storage 11a stores a retrieval dictionary generated by the retrieval dictionary generation unit 11. FIG. 6 shows retrieval dictionary data in the retrieval dictionary. As shown in FIG. 6, the retrieval dictionary data 100 has a hierarchical structure.

The retrieval dictionary data 100 is composed of distance 101 between each cluster, cluster numbers 102 of all clusters sorted in ascending order by distance from a cluster (hereinafter referred to as a cluster $C_{cen}$) nearest to the center of a multidimensional space composed of learned patterns, and information 103 of each cluster.

The information of each cluster 103 is composed of the data of clusters 1 to n. Each data piece is composed of the data structure 104 of a cluster representative, the radius 105 of the cluster, the number 106 of learned patterns which belong to the cluster and the information 107-1 to 107-m of plural learned patterns which belong to the cluster.

For example, learned pattern information 107-1 is composed of the name 107a of a learned pattern 1, the data structure 107b of the learned pattern 1, and the distance 107c between the learned pattern 1 and its cluster representative. Learned pattern information 107-2 to 107-m is also similarly composed.

Memory M1 stores the name and the data structure of one retrieval pattern read from the retrieval pattern information storage 17.

Memories M2 to M4 respectively store the data structure 104 of a cluster representative, the radius 105 of the cluster and the number 106 of learned patterns which belong to the cluster. Memory M5 stores learned pattern information 107-1 to 107-m.

Memories M6 and M7 respectively store the information of the nearest cluster to the retrieval pattern (the distance and the number of the cluster) and the information of the most similar learned pattern to the retrieval pattern (the name of the learned pattern and the distance).

The nearest cluster detector 12 obtains the nearest cluster to the retrieval pattern stored in the memory M1 using the retrieval dictionary stored in the retrieval dictionary storage 11a and instructs the memory M6 to store the result.

The learned pattern detector 13 compares all the learned patterns that belong to the nearest cluster stored in the memory M6 with the retrieval pattern stored in the memory M1, obtains a learned pattern for which the distance from the retrieval pattern is the minimum, and instructs the memory M7 to store the name of the obtained learned pattern and the minimum distance.

The retrieval range decision unit 14 decides a retrieval range using the distances between clusters stored in the retrieval dictionary, the radius of each cluster and the minimum distance stored in the memory M7.

The retrieval unit 15 retrieves the most similar pattern by comparing all the learned patterns that belong to the retrieval range obtained by the retrieval range decision unit 14 with the retrieval pattern stored in the memory M1.

The storage 16 stores the name and the data structure of the similar pattern retrieved by the retrieval unit 15.

Figure 7:
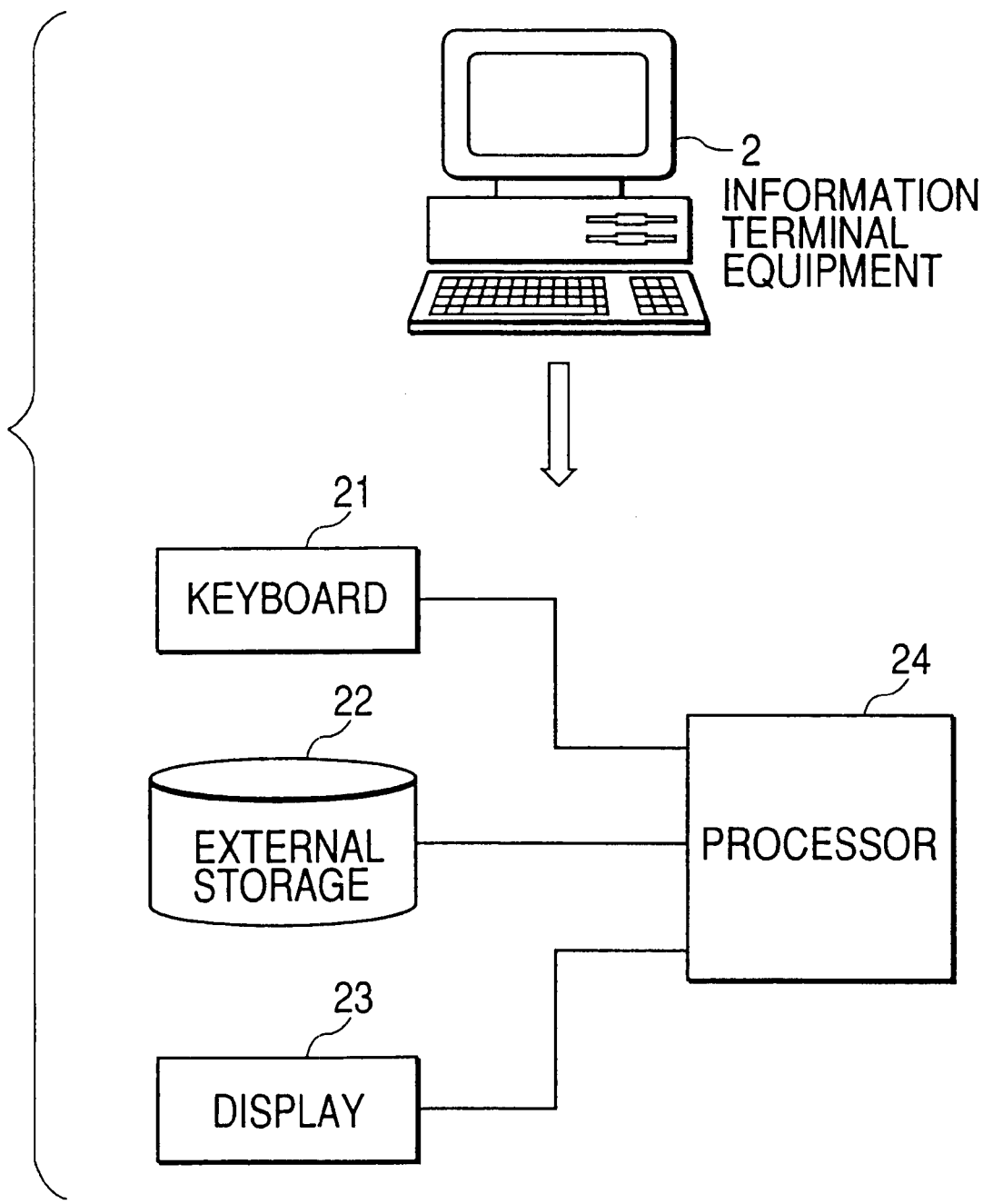
FIG. 7 shows the configuration of the system in the case where the retrieval system is applied to information terminal equipment.

Next, the configuration of the retrieval system 1 in the case where it is applied to information terminal equipment will be described. FIG. 7 shows the configuration of the retrieval system 1 in the case where it is applied to information terminal equipment.

Information terminal equipment 2 is composed of a keyboard 21, an external storage 22, a display 23 and a processor 24.

The keyboard 21 is an input device for a user to instruct operation and another input device may also be added.

The external storage 22 stores the data structure of a retrieval pattern, the retrieval dictionary, the result of retrieval and software.

Also, the retrieval pattern information storage 17 and the retrieval dictionary storage 11a can be composed as a part of the external storage 22. Furthermore, the storage 16 may also store the name and the data structure of the retrieved similar pattern.

Concretely, the external storage 22 can be composed of a hard disk for example. The display 23 is an output device for displaying a message to a user, the data of a retrieval pattern, the result of retrieval and others.

The processor 24 executes actual processing according to software stored in the external storage 22 and others. Concretely, the processor 24 can be composed of a computer system such as a microprocessor and a personal computer.

The nearest cluster detector 12, the learned pattern detector 13, the retrieval range decision unit 14 and the retrieval unit 15 can be composed of software which is run in the processor 24.

Next, the operation of the retrieval system 1 according to the present invention will be described further in detail. First, a retrieval pattern stored in the retrieval pattern information storage 17 will be described.

The data structure of retrieval patterns stored in the retrieval pattern information storage 17 is different depending upon a method of representing a pattern, the definition of distance and its calculation method.

For example, in the case of a character pattern, a voice pattern, a fingerprint pattern and a face pattern, the features of each pattern are stored as the data structure of a retrieval pattern.

The molecular structure of a compound and the secondary structure of RNA can be represented in a weighted graph and the respective weighted graphs are stored as the data structure of a retrieval pattern.

In the case of a coordinate graphic pattern, the contour data of coordinate graphics, the data of coordinate graphics itself and others are stored as the data structure of a retrieval pattern.

The data structure of a pattern relates to a method of representing the pattern, the definition of distance and its calculation method. Concretely, as for the Euclidean distance for a character pattern for example, the Euclidean distance between patterns $p_i$ and $p_j$ is calculated according to the following formula (1) in the case where the feature of the pattern $p_i$ is represented by $(p_{i1}, p_{i2}, ---, p_{im})$.

[Formula 1]

$$d(p_i, p_j) = \sqrt{\sum_{k=1}^{m} (p_{ik} - p_{jk})^2} \tag{1}$$

Next, a method of classifying learned patterns when a learned pattern is stored in the retrieval dictionary storage 11a will be described. The retrieval dictionary storage 11a stores the retrieval dictionary described in relation to FIG. 6.

As for a method of classifying learned patterns, an arbitrary classification method corresponding to a pattern to be processed can be selected from among methods of classifying patterns generally announced.

As for a character pattern for example, there is a clustering method which is called farthest neighbor method. In the farthest neighbor method, the longest distance among the distances between arbitrary two patterns in each cluster is defined as distance between clusters and two clusters for which the above distance is the minimum are integrated. Distance between two clusters $C_i$ and $C_j$ is defined according to the following formula (2).

[Formula 2]

$$d(C_i, C_j) = \{\max\ d(p_i, p_j) | p_i \in C_i, p_j \in C_j\} \tag{2}$$

Next, a description will be made of a method of obtaining a cluster nearest to the center of a multidimensional space composed of learned patterns. In the case where a pattern is represented by its features, the mean value of features in each dimension of all cluster representatives is obtained and a cluster closest to the obtained mean value of the features is defined as a cluster $C_{cen}$ nearest to the center of the multidimensional space.

Also, in the case where a pattern is represented by a method except for features, a cluster which is the smallest in the sum of distance between it and each of all clusters is defined as a cluster $C_{cen}$ nearest to the center of the multidimensional space.

Distance between the cluster $C_{cen}$ nearest to the center of the multidimensional space and each of all clusters is sorted in ascending order and cluster numbers are stored in the retrieval dictionary in the sorted order.

Next, a method of obtaining the representative of cluster stored in the retrieval dictionary will be described. In the case where a pattern is represented by its features, the mean value of features in each dimension of all the learned patterns that belong to the cluster is obtained and the obtained mean value of the features is defined as the representative of the cluster.

Also, in the case where a pattern is represented by a method except for features, distance between each learned pattern which belongs to a cluster is calculated and a learned pattern which is the smallest in the sum of distance between each learned pattern in the corresponding cluster is defined as the representative of the cluster.

Next, a method of obtaining the radius of a cluster stored in the retrieval dictionary storage 11a will be described. As for the method of obtaining the radius of a cluster, distance between each learned pattern which belongs to the cluster and the representative of the corresponding cluster is calculated and the maximum distance is defined as the radius of the cluster. Distance between the representatives of clusters is defined as distance between the clusters, and distance between a pattern and the representative of a cluster is defined as distance between the pattern and the cluster.

Next, the nearest cluster detector 12 will be described. The nearest cluster detector 12 obtains the nearest cluster to a retrieval pattern stored in the memory M1 using the retrieval dictionary.

When the nearest cluster to a retrieval pattern q is obtained, the retrieval pattern q is not compared with all clusters but the nearest cluster is obtained, checking to see whether a cluster is included in a comparison range or not, in a determined order.

To determine a cluster comparison order, a first step is to calculate distance $D(q, C_{cen})$ between the retrieval pattern q and the cluster $C_{cen}$ nearest to the center of a multidimensional space composed of learned patterns.

The next step is to find the smallest i and the largest i to satisfy a formula $|D(C_{F(i)}, C_{cen})-D(q, C_{cen})|<\epsilon$ (the above-described specific space refers to an area to satisfy a formula $|D(C_{F(i)}, C_{cen})-D(q, C_{cen})|<\epsilon$, where i=1, 2, . . . , and set S equal to (the smallest i+the largest i)/2. |A| denotes the absolute value of A.

F(i) indicates the i-th cluster number of clusters when all clusters are sorted in ascending order by distance from $C_{cen}$. $\epsilon$ is a non-negative real number.

As a concrete example, $\epsilon=D(q, C_{cen})/20$ is set. $\epsilon$ may also be a specific number. It is judged whether a cluster $C_{F(i)}$ is included in a comparison range, where i=S, S−1, S+1, S−2, S+2, . . . . If included, the distance between the representative of the cluster and the retrieval pattern q is calculated, and a cluster near to the retrieval cluster q is obtained.

Afterward, a range in which clusters are to be compared next is decided using the minimum distance currently obtained between the retrieval pattern q and a cluster and distance between each cluster stored in the retrieval dictionary. Formulae (3a) to (3c) show a condition for checking whether a cluster is included in a comparison range or not.

[Formula 3]

$$D(C_{F(i)}, C_{MinClass}) < 2*D(q, C_{MinClass}) \tag{3a}$$

$$D(C_{F(i)}, C_{cen}) > D(q, C_{cen}) - D(q, C_{MinClass}) \tag{3b}$$

$$D(C_{F(i)}, C_{cen}) < D(q, C_{cen}) + D(q, C_{MinClass}) \tag{3c}$$

$C_{MinClass}$ denotes the nearest cluster currently obtained. $D(q, C_{cen})$ is set as an initial value of distance $D(q, C_{MinClass})$ between the retrieval pattern q and $C_{MinClass}$.

A cluster that does not satisfy the formulae (3a) to (3c) is not required to be compared because the distance between the cluster and the retrieval pattern q is larger than $D(q, C_{MinClass})$. $D(q, C_{MinClass})$ becomes smaller by repeating comparison between the retrieval pattern q and a cluster as described above and therefore, a set of clusters which satisfy the formulae (3a) to (3c) becomes smaller.

Therefore, the nearest cluster to the retrieval pattern q can be obtained at high speed. The number of the obtained nearest cluster and the minimum distance are stored in the memory M6.

Figure 8:
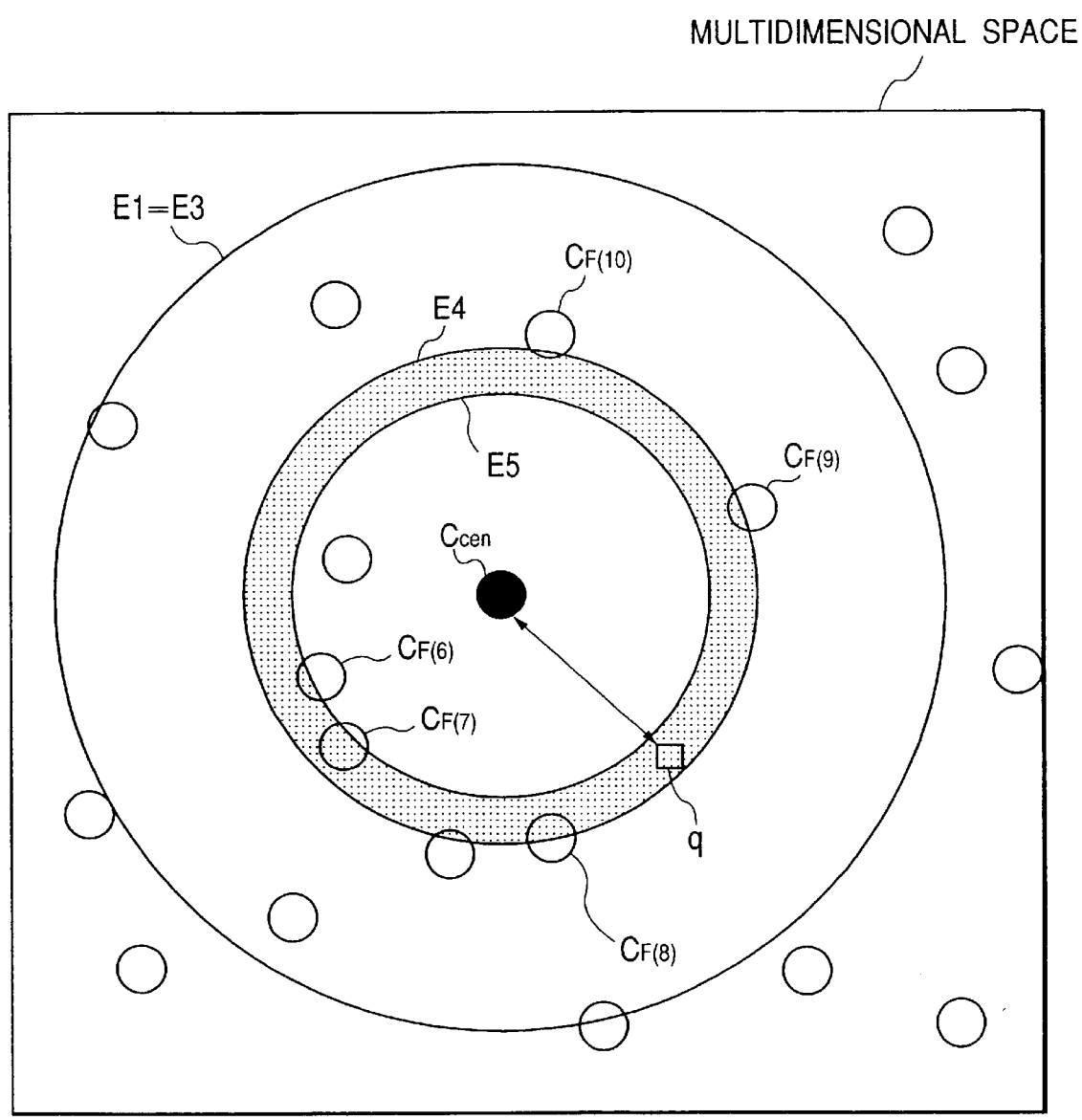
FIG. 8 explains the operation of the nearest cluster detector.
Figure 9:
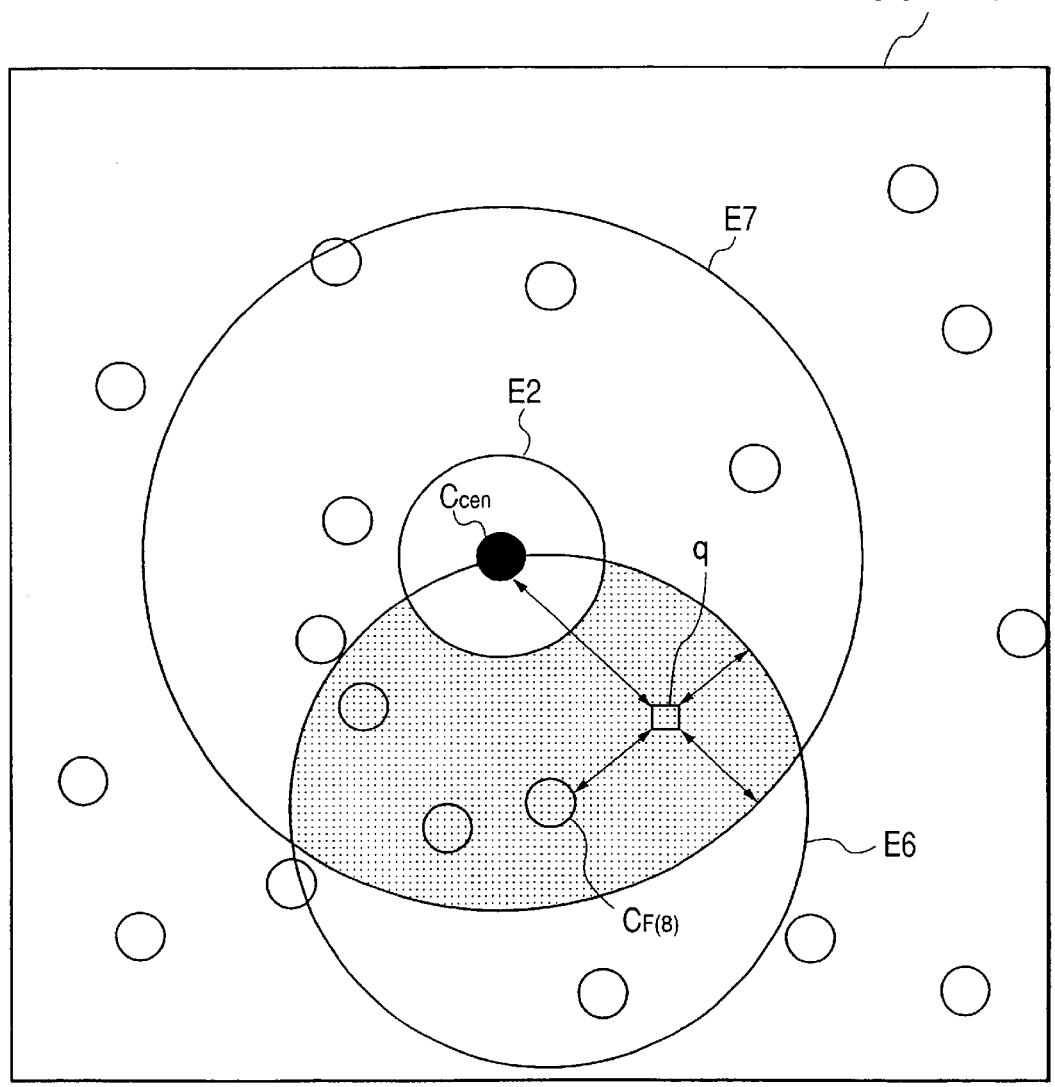
FIG. 9 explains the operation of the nearest cluster detector.

FIGS. 8 and 9 explain the operation of the nearest cluster detector 12. The distance $D(q, C_{cen})$ between the retrieval pattern q and cluster $C_{cen}$ is calculated and MinClass=cen (number of $C_{cen}$) and $D(q, C_{MinClass})=D(q, C_{cen})$ are set.

As shown in FIG. 8, the shaded portion is a portion containing clusters (a common area inside a sphere E4 and outside a sphere E5) satisfying $|D(C_{F(i)}, C_{cen})-D(q, C_{cen})|<\epsilon$. The smallest i and the largest i to satisfy $|D(C_{F(i)}, C_{cen})-D(q, C_{cen})|<\epsilon$ are 6 and 10, respectively, where i=1, 2, . . . . At this time, S is 8 (=(6+10)/2). Therefore, a cluster $C_{F(i)}$ is evaluated when i changes as 8, 7, 9, 6, and 10 in this order.

As shown in FIG. 8, a set of clusters to satisfy the formulae (3a) to (3c) is included in the spheres E1 and E3, respectively.

Since $D(q, C_{cen})=D(q, C_{MinClass})$, E1 is equal to E3 and a set of clusters to satisfy the formula (3b) is all clusters existing in the retrieval dictionary.

Since the cluster $C_{F(8)}$ satisfies the formulae (3a) to (3c), distance $D(q, C_{F(8)})$ between the retrieval pattern q and the cluster $C_{F(8)}$ is calculated. Since the distance $D(q, C_{F(8)})$ is smaller than $D(q, C_{MinClass})$, $D(q, C_{MinClass})=D(q, C_{F(8)})$ and MinClass=F(8) are satisfied.

A set of clusters in a comparison range at this time, that is, clusters to satisfy the formulae (3a) to (3c) are clusters included in a portion in which a sphere E2 is excluded from a common portion of spheres E6 and E7, and spheres E6 and E7 contain clusters to satisfy the formulae (3a) and (3c), respectively. A portion outside the sphere E2 contains clusters to satisfy the formula (3b). Therefore, a dotted area in the FIG. is a comparison range.

Figure 10:
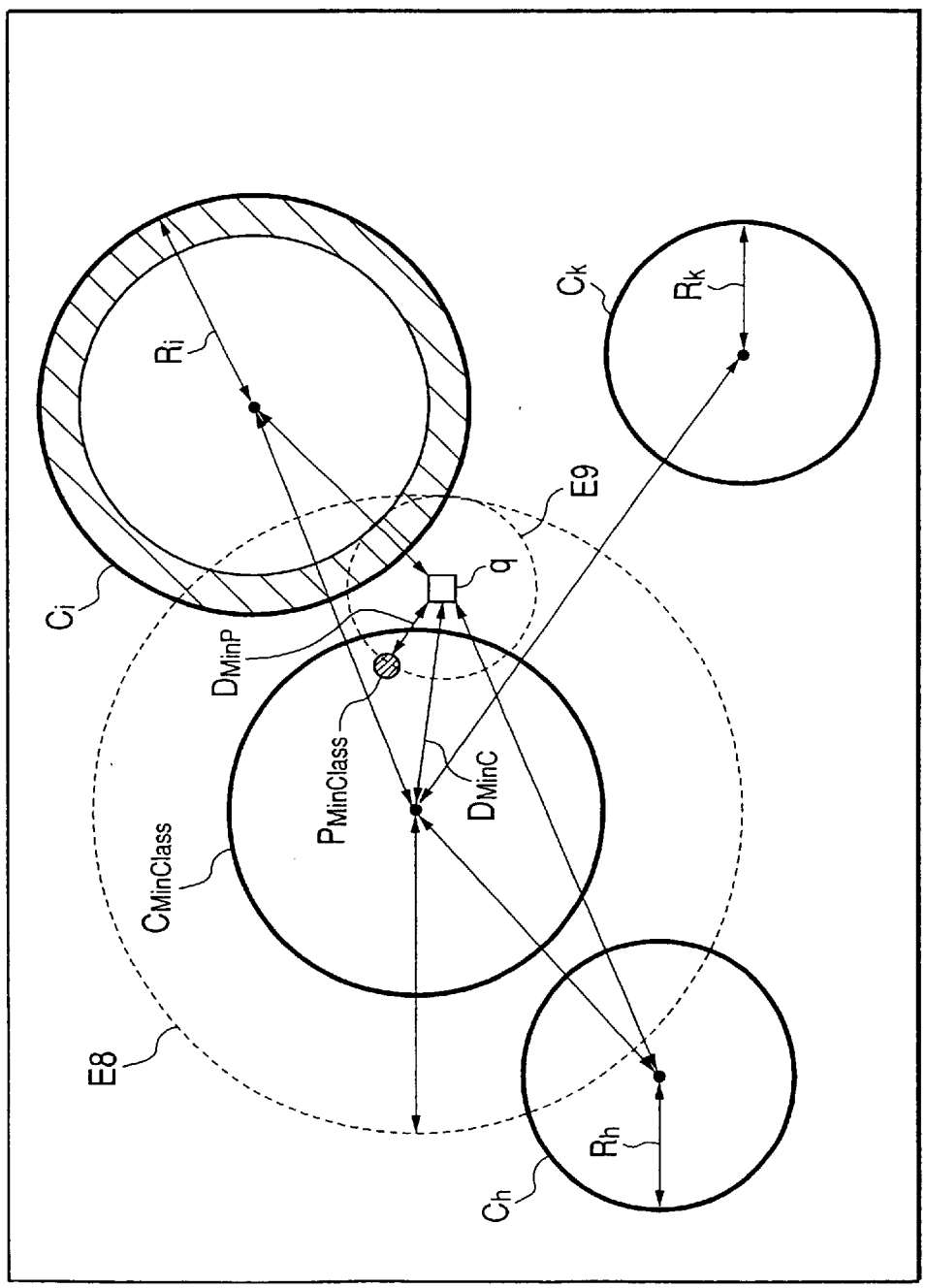
FIG. 10 explains the operation of the learned pattern detector and the retrieval range decision unit.

Next, the operation of the learned pattern detector 13 and the retrieval range decision unit 14 will be described. FIG. 10 explains the operation of the learned pattern detector 13 and the retrieval range decision unit 14.

The learned pattern detector 13 compares all the learned patterns that belong to the nearest cluster $C_{MinClass}$ obtained by the nearest cluster detector 12 and a retrieval pattern, and obtains a learned pattern $P_{MinClass}$ which is the nearest. The obtained minimum distance is stored as $D_{MinP}$ in the memory M7.

As shown in FIG. 10, it is considered based upon the result $D(q, C_{MinClass})(=D_{MinP})$ of detection by the nearest cluster detector 12, and that of detection by the learned pattern detector 13 that the retrieval range is the learned patterns included in a dotted sphere E9.

Therefore, the retrieval range decision unit 14 first obtains a range in which clusters are retrieved and next, checks whether or not learned patterns which belong to a cluster in the retrieval range are required to be retrieved.

Next, the final learned pattern retrieval range in which learned patterns which belong to a cluster required to be retrieved is decided. Afterward, the retrieval unit 15 retrieves the most similar learned pattern to the retrieval pattern in the range in which the learned patterns are retrieved. The retrieval range of clusters is equivalent to a set of clusters which satisfy the following formula (4).

[Formula 4]

$$D(C_{MinClass}, C_i) < D(q, C_{MinClass}) + D_{MinP} + R_i \tag{4}$$

$R_i$ shows the radius of cluster $C_i$. That the formula (4) is not satisfied means to be outside the dotted sphere E8 shown in FIG. 10.

A cluster ($C_k$) located outside the dotted sphere E8 is not required to be retrieved because it is clear that distance between a learned pattern which belongs to the cluster and the retrieval pattern q is lager than $D_{MinP}$.

Clusters $C_i$ and $C_h$ shown in FIG. 10 satisfy the formula (4). In order to check how much a cluster which satisfies the formula (4) is apart from the retrieval pattern q and whether a learned pattern which belongs to the cluster is required to be retrieved or not, that is, whether the cluster is overlapped with a dotted sphere E9 or not, distance $D(q, C_i)$ between the retrieval pattern q and the cluster $C_i$ which satisfies the formula (4) is calculated.

As the cluster is overlapped with the dotted sphere E9 if the distance satisfies the following formula (5), the learned pattern which belongs to the cluster is required to be retrieved.

[Formula 5]

$$D(q, C_i) < D_{MinP} + R_i \tag{5}$$

That the formula (4) is satisfied and the formula (5) is not satisfied means not being overlapped with the dotted sphere E9 though the above cluster is overlapped with the dotted sphere E8 shown in FIG. 10.

As distance between a learned pattern which belongs to such a cluster ($C_h$) and the retrieval pattern q is larger than $D_{MinP}$, the cluster is not required to be retrieved.

Therefore, the cluster $C_i$ shown in FIG. 10 satisfies the formulae (4) and (5).

All the learned patterns that belong to the obtained cluster that satisfies the formulae (4) and (5) are not required to be retrieved. That is, only learned patterns which may be included in the dotted sphere E9 have only to be retrieved.

The learned pattern p which satisfies the following formula (6) is required to be retrieved because it may be included in the dotted sphere E9.

[Formula 6]

$$D(p, C_i) > D(q, C_i) - D_{MinP} \tag{6}$$

The cluster $C_i$ shown in FIG. 10 satisfies the formulae (4) and (5) and a part having oblique lines of the cluster $C_i$ includes learned patterns which satisfy the formula (6).

As described above, a retrieval range is finally obtained and the retrieval unit 15 executes retrieval in the retrieval range.

Figure 11:
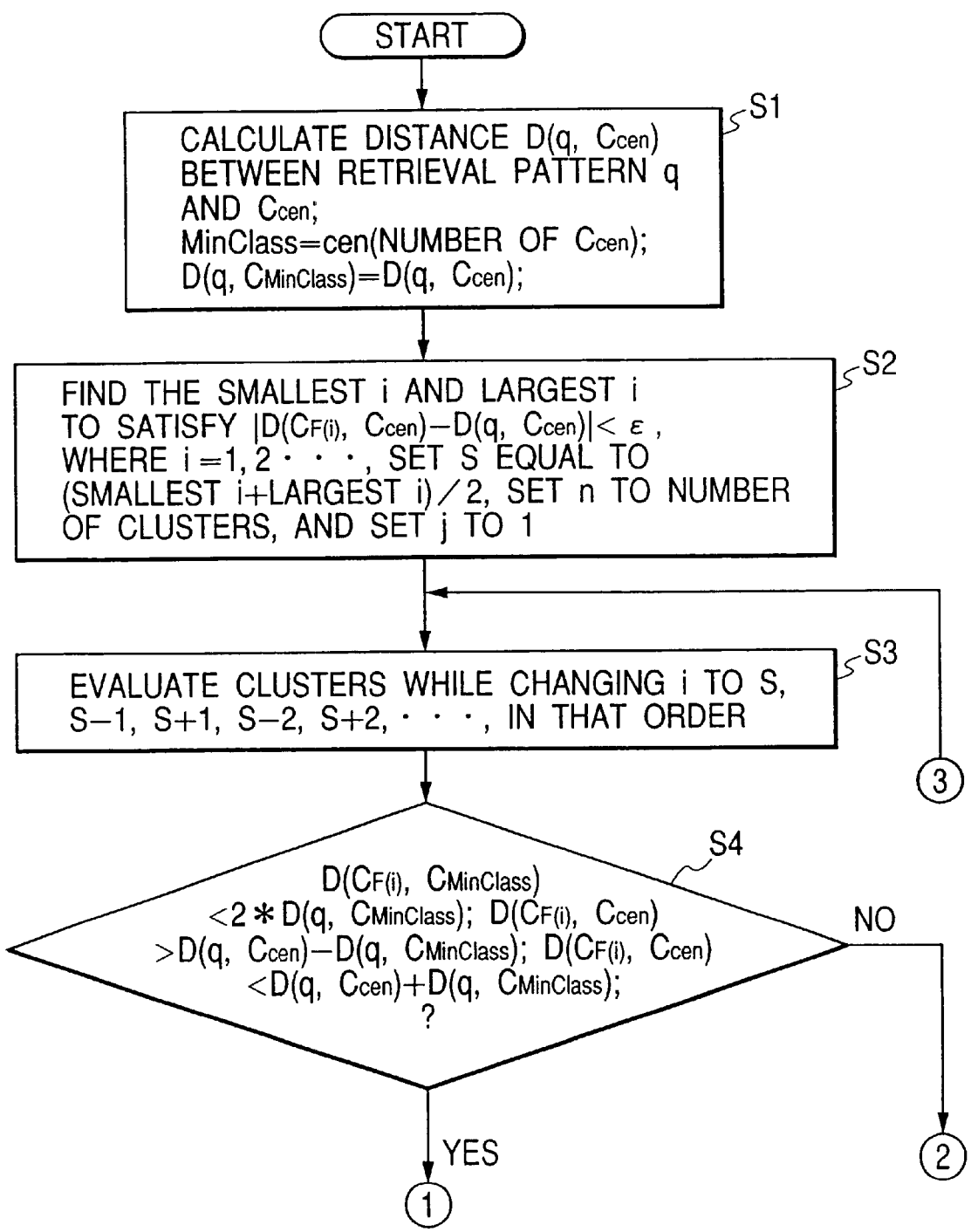
FIG. 11 is a flowchart showing a procedure for operating the nearest cluster detector.
Figure 12:
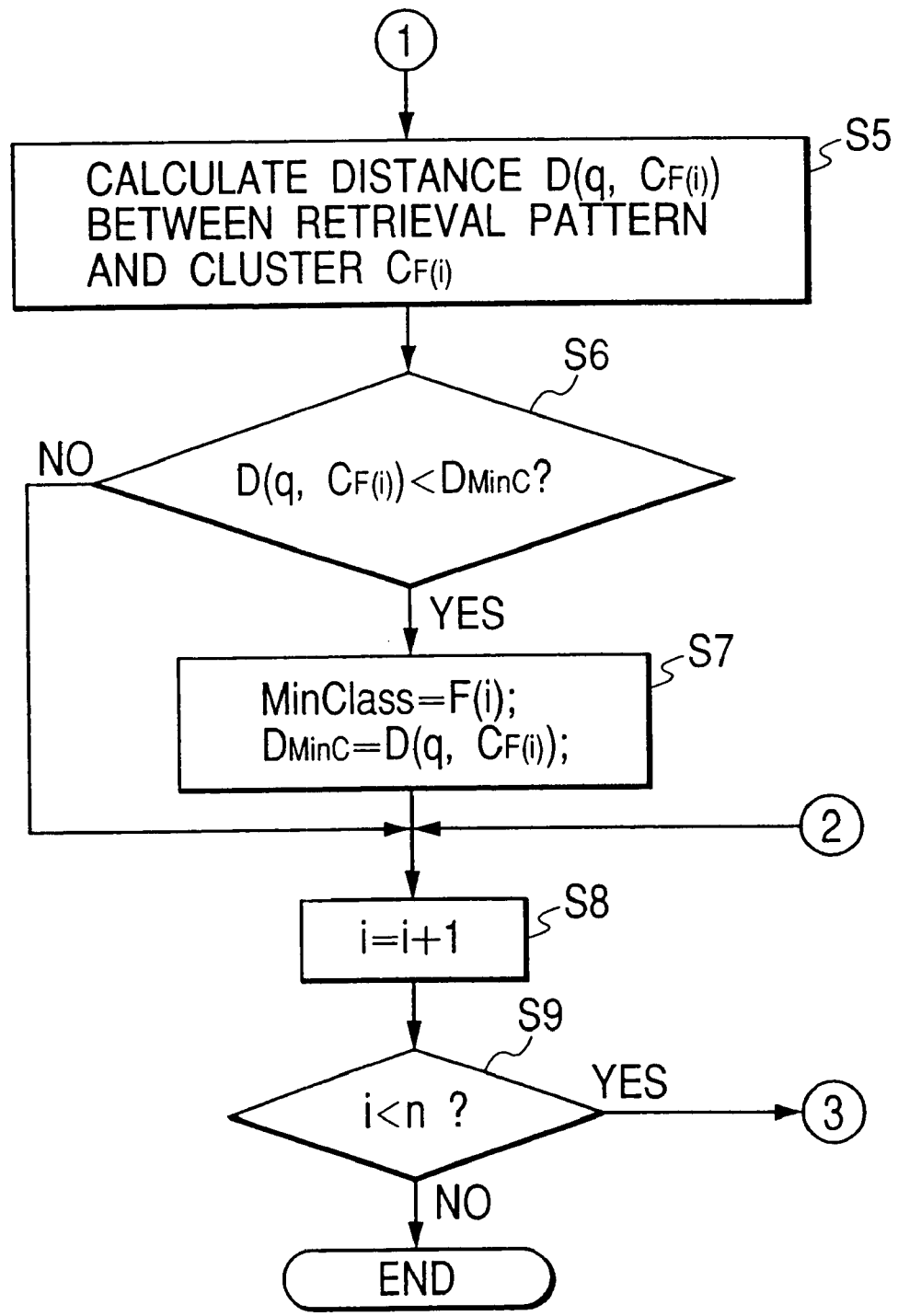
FIG. 12 is a flowchart showing a procedure for operating the learned pattern detector.

Next, the operation of the nearest cluster detector 12 will be described using a flowchart. FIGS. 11 and 12 are a flowchart showing a procedure for the operation of the nearest cluster detector 12.

[S1] Distance $D(q, C_{cen})$ between the retrieval pattern q and cluster $C_{cen}$ is calculated and MinClass=cen(number of $C_{cen}$) and $D(q, C_{MinClass})=D(q, C_{cen})$ are set.

[S2] The smallest i and the largest i to satisfy a formula $|D(C_{F(i)}, C_{cen}) - D(q, C_{cen})| < \epsilon$ are obtained, where i=1, 2, ..., and S is set equal to (the smallest i+the largest i)/2. j is set equal to 1 and the number n of clusters is set.

[S3] A cluster comparison order is set as follows: i=S, S−1, S+1, S−2, S+2, ....

[S4] It is checked whether the cluster $C_{F(i)}$ satisfies the formulae (3a) to (3c). That is, a cluster to compare the retrieval pattern q with $C_{F(i)}$ is set. If the cluster $C_{F(i)}$ satisfies the formulae (3a) to (3c), processing proceeds to step S5, and if it does not satisfy the formulae (3a) to (3c), processing proceeds to step S8.

[S5] The distance between the retrieval pattern q and the cluster $C_{F(i)}$ is calculated.

[S6] Compare the distance obtained in step S5 with the minimum distance currently obtained, if the distance is smaller, processing proceeds to step S7 and if not, processing proceeds to step S8.

[S7] The name of the nearest cluster to the retrieval pattern q and the distance between the retrieval pattern q and the nearest cluster are rewritten.

[S8] A cluster to be compared next is set.

[S9] It is checked whether all clusters are processed or not. If all clusters are not processed, processing is returned to step S3 and if all clusters are processed, processing is terminated.

Figure 13:
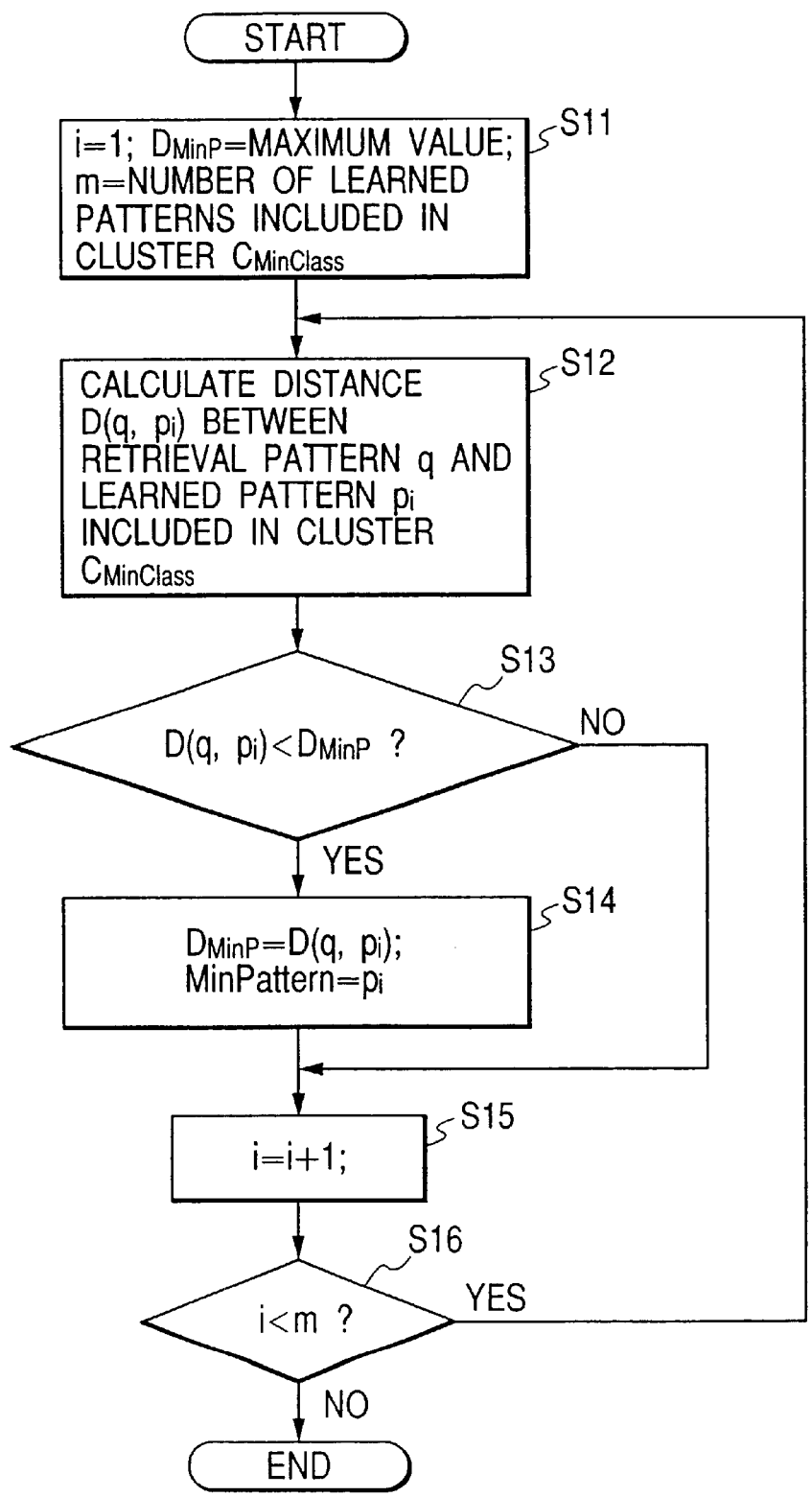
FIG. 13 is a flowchart showing a procedure for operating the retrieval pattern detector.

Next, the operation of the learned pattern detector 13 will be described using a flowchart. FIG. 13 is a flowchart showing a procedure for the operation of the learned pattern detector 13.

The learned pattern detector 13 obtains a learned pattern distance from the retrieval pattern q which is the minimum among learned patterns which belong to the nearest cluster $C_{MinClass}$ to the retrieval pattern q.

[S11] The number i of a learned pattern is set to 1 and distance $D_{MinP}$ between the learned pattern and the retrieval pattern is set to the maximum value.

[S12] The distance $D(q, p_i)$ between the retrieval pattern q and the learned pattern $p_i$ which belongs to the cluster $C_{MinClass}$ is calculated.

[S13] The distance obtained in step S12 and $D_{MinP}$ are compared, if the distance is smaller than $D_{MinP}$, processing proceeds to step S14 and if not, processing proceeds to step S15.

[S14] $D_{MinP}$ and the name of the learned pattern are rewritten.

[S15] The number of a learned pattern is incremented by 1.

[S16] It is checked whether all the learned patterns are processed or not. If all the learned patterns are not processed, processing is returned to step S12. If all the learned patterns are processed, processing is terminated.

Figure 14:
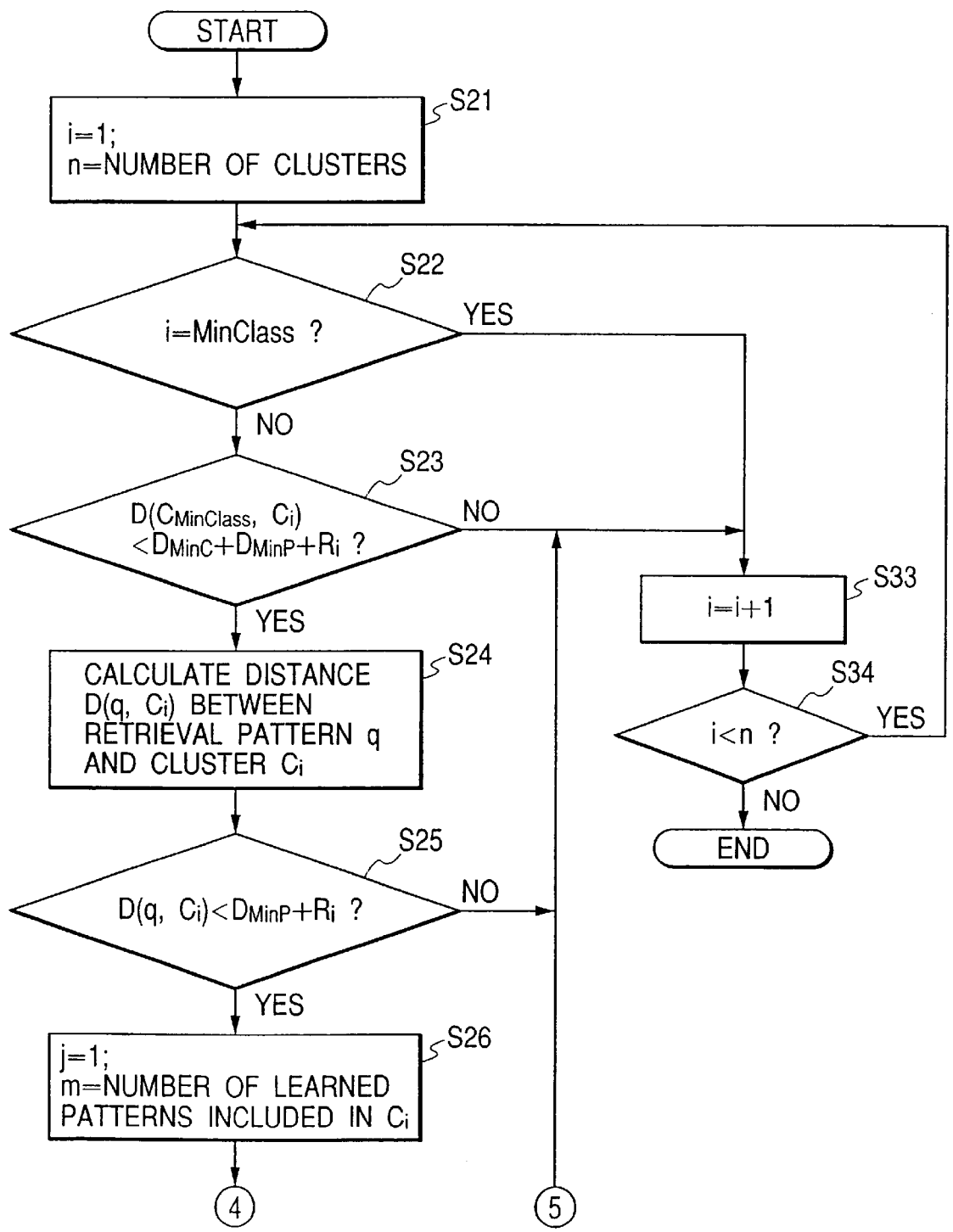
FIG. 14 is a flowchart showing a procedure for operating the retrieval range decision unit and the retrieval unit.
Figure 15:
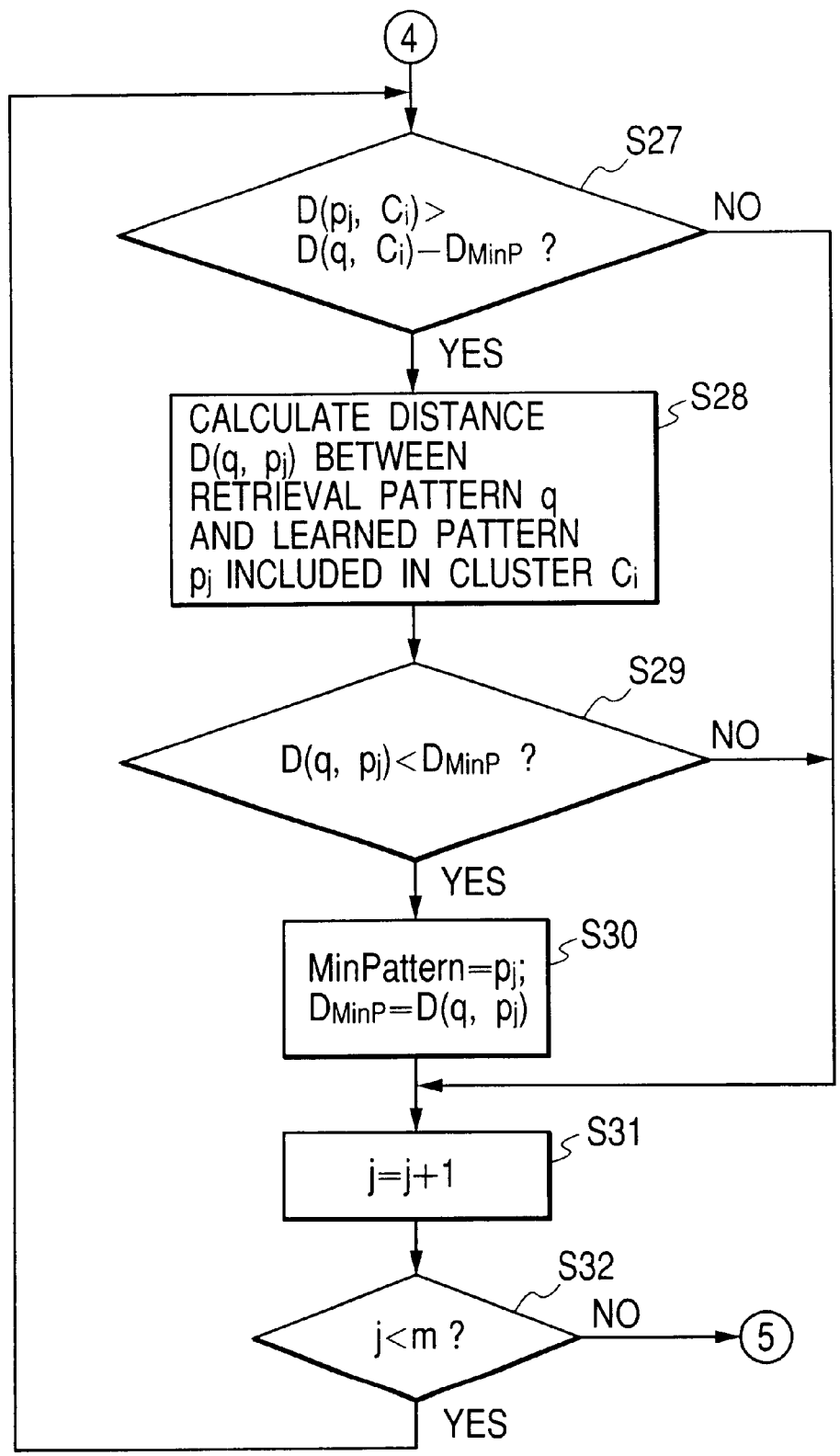
FIG. 15 is a flowchart showing a procedure for operating the retrieval range decision unit and the retrieval unit.

Next, the operation of the retrieval range decision unit 14 and the retrieval unit 15 will be described using a flowchart. FIGS. 14 and 15 are flowcharts showing a procedure for the operation of the retrieval range decision unit 14 and the retrieval unit 15.

The retrieval range decision unit 14 decides a retrieval range and the retrieval unit 15 retrieves the most similar learned pattern by comparing each learned pattern in the range and the retrieval pattern.

[S21] The number i of a cluster is set to 1 and the number of clusters is set to n.

[S22] It is checked whether the cluster $C_i$ is $C_{MinClass}$ or not. If $C_i$ is $C_{MinClass}$, processing proceeds to step S33 and if not, processing proceeds to step S23.

[S23] It is checked whether the cluster satisfies the formula (4) or not. If the cluster satisfies the formula (4), processing proceeds to step S24 and if not, processing proceeds to step S33.

[S24] The distance $D(q, C_i)$ between the retrieval pattern q and the cluster $C_i$ is calculated.

[S25] It is checked whether the distance obtained in step S24 satisfies the formula (5) or not. If the distance satisfies the formula (5), processing proceeds to step S26 and if not, processing proceeds to step S33.

[S26] The number j of a learned pattern is set to 1 and the number of learned patterns that belong to the cluster $C_i$ is set to m.

[S27] It is checked whether a learned pattern $p_j$ satisfies the formula (6) or not. That is, it is checked whether $p_j$ is required to be retrieved or not. If the learned pattern satisfies the formula (6), processing proceeds to step S28 and if not, processing proceeds to step S31.

[S28] The distance between the retrieval pattern q and $p_j$ is calculated.

[S29] It is checked whether the distance obtained in step S28 is the minimum or not. If the distance is the minimum, processing proceeds to step S30 and if not, processing proceeds to step S31.

[S30] $D_{MinP}$ and the name of the similar pattern are rewritten.

[S31] The number of a learned pattern is incremented by 1.

[S32] If all the learned patterns that belong to $C_i$ are not processed, processing is returned to step S27. If all the learned patterns are processed, processing proceeds to step S33.

[S33] The number of a cluster is incremented.

[S34] If all clusters are processed, processing is terminated and if not, processing is returned to step S22.

Next, retrieval speed and retrieval precision when a character pattern is concretely retrieved using the retrieval system 1 according to the present invention will be described.

As for a character pattern, a character image printed on paper is input to a computer via a scanner.

Also, a character pattern is represented by a peripheral feature and a difference between character patterns is represented by the Euclidean distance between the character patterns. FIG. 16 shows a part of a cluster in case 3,355 character patterns are grouped up to 500 clusters by the farthest neighbor method. FIG. 16 shows a part of the cluster including character patterns.

The representative and the radius of each cluster and the distances between clusters are obtained and the retrieval dictionary is generated. 10,065 unlearned patterns (retrieval patterns) are retrieved using the retrieval dictionary by a round robin retrieval method and by the retrieval system 1 according to the present invention.

As a result, in the case of the round robin retrieval method, retrieval precision is 100% and a retrieval speed is 3355 times, while in case the retrieval system 1 according to the present invention is used, retrieval precision is 100% and a retrieval speed is 815.90 times.

As described above, the retrieval precision is 100% in both cases, however, the retrieval speed in the present invention is sped up 4.15 times of the round robin retrieval method. The retrieval precision and retrieval speed are respectively defined in the following formulae (7) and (8).

[Formula 7]

$$\text{Retrieval precision} = \{\text{number of(retrieval result=retrieval result in round robin retrieval method)}/(\text{total number of retrieved character patterns})\} \times 100\% \quad (7)$$

[Formula 8]

$$\text{Retrieval speed} = (\text{sum of frequencies of calculating distance when patterns are retrieved})/(\text{total number of retrieved character patterns}) \quad (8)$$

As described above, according to the present invention, the most similar pattern to a retrieval pattern can be precisely retrieved at high speed. Particularly, the retrieval precision of the retrieval system 1 according to the present invention does not depend upon a method of representing a pattern, the definition of distance between patterns, its calculation method and a method of classifying patterns.

Therefore, a problem that an unknown pattern in a pattern recognition field cannot be completely recognized can be partially solved, and a problem when a data which has a structure is retrieved at high speed among a large quantity of data having a structure or a problem when data having a similar structure is retrieved at high speed and others can be solved.

Figure 17:
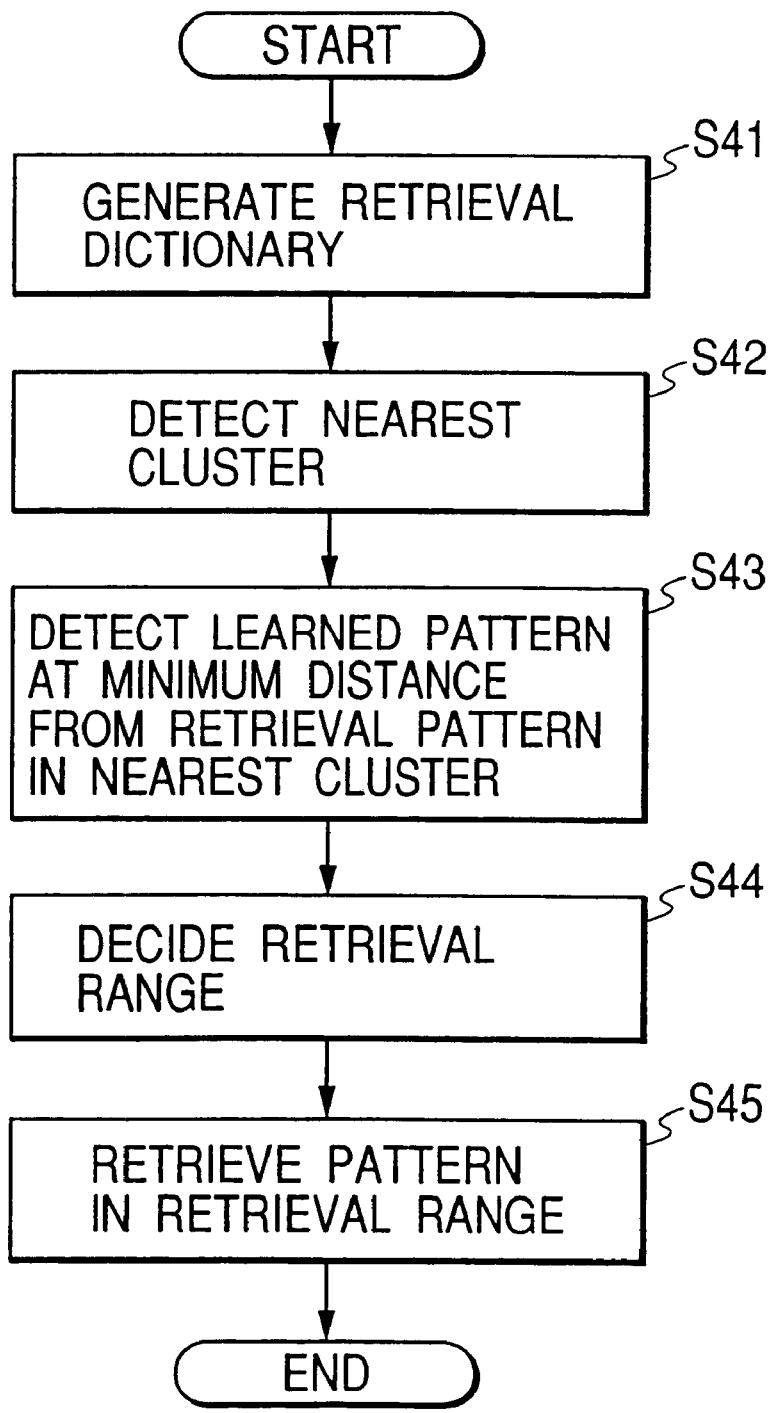
FIG. 17 is a flowchart showing a procedure for processing a detection method according to the present invention.
Figure 18A:
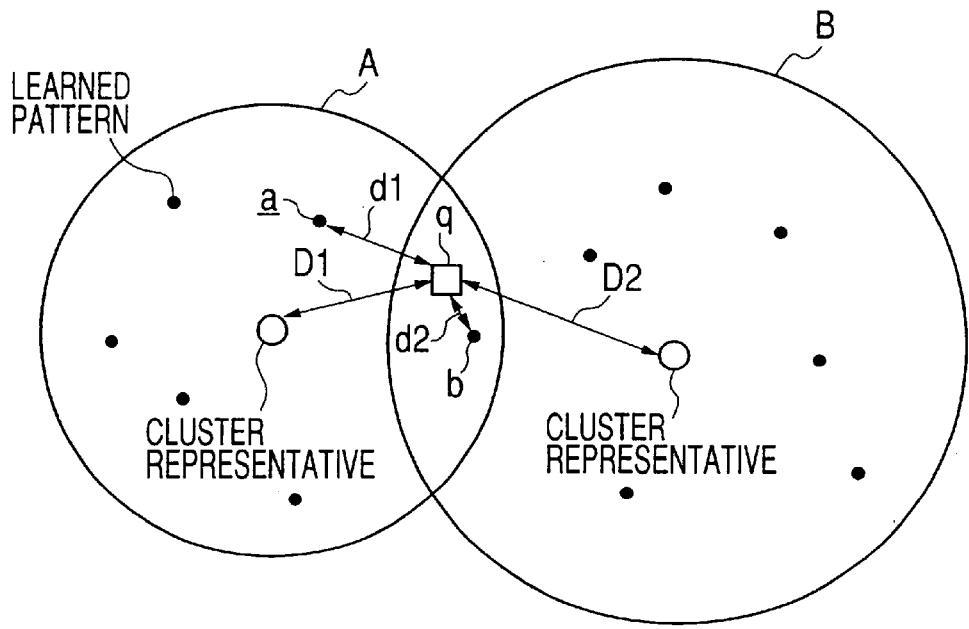
FIGS. 18A and 18B show a problem of precision in a rough classification retrieval method.
Figure 18B:
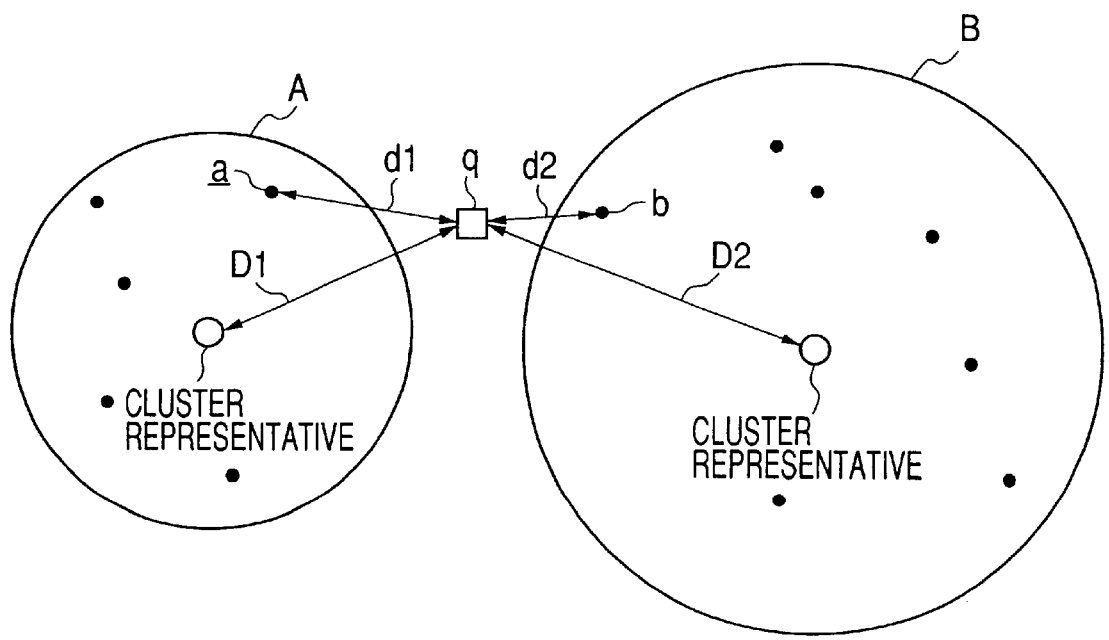

Next, a retrieval method according to the present invention will be described. FIG. 17 is a flowchart showing a procedure for processing by a retrieval method according to the present invention.

[S41] Classifying learned patterns into plural clusters, using the clusters to generate a retrieval dictionary.

[S42] From among clusters which are included in a specific space, a cluster nearest to an input retrieval pattern is detected using the retrieval dictionary. The space is specified between a couple of spheres having radiuses smaller and larger than a distance between a central cluster near the center of a multidimensional space and the retrieval pattern.

[S43] A learned pattern at the minimum distance from the retrieval pattern is detected by comparing all the learned patterns that belong to the nearest cluster with the retrieval pattern.

[S44] A retrieval range is decided using the learned pattern and the retrieval dictionary.

[S45] The retrieval pattern is retrieved among all the learned patterns that belong to the retrieval range.

As described above, the retrieval method according to the present invention has the steps of classifying learned patterns into plural clusters, generates a retrieval dictionary by the clusters, and, from among clusters which are included in a space between a couple of spheres having radiuses smaller and larger, respectively, than a distance from central cluster that locates near the center of a multidimensional space to an input retrieval pattern, detecting a cluster nearest to the retrieval pattern. The method further has the steps of detecting a learned pattern at the minimum distance from the retrieval pattern in the nearest cluster, and deciding the pattern retrieval range using the detected learned pattern and the retrieval dictionary to execute retrieval.

Hereby, high-speed and high-precision retrieval is enabled without depending upon distance between patterns, a representation method and a classification method.

A computer program for realizing the function of the above retrieval system 1 and retrieval method can be stored on a recording medium such as a semiconductor memory and a magnetic recording medium.

Hereby, the program can be also circulated on the market with the program stored on a portable recording medium such as CD-ROM and a floppy disk, can also be stored in a storage of a computer connected via a network and transferred to another computer via the network.

When the program is run on a computer, it is stored in a hard disk and others in the computer, is loaded into a main memory and is executed.

What is claimed is:

1. A retrieval system that executes pattern retrieval, comprising:

a retrieval dictionary generation unit that classified learned patterns into plural clusters, and generates a retrieval dictionary using the clusters;

a nearest cluster detector that defines a region in a multidimensional space between a couple of spheres having radiuses smaller and larger, respectively, than a distance from a central cluster that locates near the center of the multidimensional space to an input retrieval pattern, detects a cluster nearest to the retrieval pattern beginning with clusters in the defined region from among the clusters in the multidimensional space utilizing the retrieval dictionary;

a learned pattern detector that compares each of learned patterns belonging to the nearest cluster with the retrieval pattern and detects a learned pattern at a predetermined distance from the retrieval pattern;

a retrieval range decision unit that decides a retrieval range using the learned pattern detected by the learned pattern detector and the retrieval dictionary; and a retrieval unit that retrieves the retrieval pattern among the learned patterns in the retrieval range.

2. The retrieval system according to claim 1, wherein the retrieval dictionary generation unit classifies the learned patterns into plural clusters based upon distances between the learned patterns and obtains a representative of each of the clusters, calculates the radius of each of the clusters, distances between the clusters, and distance between each of the learned patterns and each of the clusters, and cluster numbers of clusters sorted in ascending order by distance from the central cluster to generate the retrieval dictionary.

3. The retrieval system according to claim 2, wherein, if the learned pattern is represented by its feature, the retrieval dictionary generation unit obtains the representative of each of the clusters by obtaining a mean value of the features in each dimension of the learned patterns belonging to the cluster and setting the obtained mean value as the representative of the cluster.

4. The retrieval system according to claim 2, wherein, if the learned pattern is represented by a value other than its feature, the retrieval dictionary generation unit obtains the representative of each of the clusters by calculating distances between each and every learned patterns belonging to the cluster and setting a learned pattern for which the sum of the distances from the learned pattern to each of the other learned patterns belonging to the cluster is minimum as the representative of the cluster.

5. The retrieval system according to claim 2, wherein the retrieval dictionary generation unit obtains the radius of each of the cluster by calculating distances between each of the learned patterns belonging to the cluster and the representative of the cluster and setting a maximum distance as the radius of the cluster.

6. The retrieval system according to claim 2, wherein the retrieval dictionary generation unit obtains the distances between the clusters by defining distances between the representatives of the clusters as the distances between the clusters.

7. The retrieval system according to claim 2, wherein the retrieval dictionary generation unit obtains the distance between each of the learned patterns and each of the clusters by setting a distance between each of the learned patterns and each of the representatives of the clusters as the distance between each of the learned patterns and each of the clusters.

8. The retrieval system according to claim 2, wherein the retrieval dictionary generation unit obtains the central cluster, if the representative of the cluster is represented by its feature, by obtaining a mean value of the features in each dimension of the representatives of the clusters and setting a cluster near to the obtained mean value as the central cluster.

9. The retrieval system according to claim 2, wherein the retrieval dictionary generation unit obtains the central cluster, if the representative of the cluster is represented by a value other than its feature, by setting a cluster for which the sum of distances between the clusters is minimum as the central cluster.

10. The retrieval system according to claim 2, wherein the retrieval dictionary generation unit has hierarchical structure and has the distances between the clusters, the cluster numbers and information of each of the clusters in a higher level of hierarchy, and the information of each of the clusters includes a data structure of the representative of the cluster, the radius of the cluster, the number of the learned patterns belonging to the cluster and information of each of the learned patterns belonging to the cluster.

11. The retrieval system according to claim 10, wherein the information of each of the learned patterns includes a name of the learned pattern, a data structure of the learned pattern and a distance between the learned pattern and the representative of the cluster.

12. The retrieval system according to claim 1, wherein the nearest cluster detector selects clusters by the cluster numbers stored in the retrieval dictionary, calculates distances between each of the representatives of the clusters and the retrieval pattern, and obtains a cluster near to the retrieval pattern to reduce a range in which clusters are compared.

13. The retrieval system according to claim 12, wherein the nearest cluster detector compares the retrieval pattern with the clusters by calculating a distance $D(q, C_{cen})$ between the central cluster $C_{cen}$ and the retrieval pattern q and comparing clusters $C_i$ in ascending order of $|D(Ci, C_{cen}) - D(q, C_{cen})|$.

14. The retrieval system according to claim 12, wherein the nearest cluster detector sets the range in which the cluster detector sets the range in which the clusters are compared to include all clusters satisfying the following formulae:

$$D(C_{F(i)}, C_{MinClass}) < 2 * D(q, C_{MinClass})$$
$$D(C_{F(i)}, C_{cen}) > D(q, C_{cen}) - D(q, C_{MinClass})$$
$$D(C_{F(i)}, C_{cen}) < D(q, C_{cen}) + D(q, C_{MinClass}),$$

where F(i) is an i-th cluster number in cluster comparison order, $C_{MinClass}$ is a cluster located at a minimum distance from the retrieval pattern in process of detection, $D(C_{F(i)}, C_{cen})$ is a distance between $C_{F(i)}$, $C_{cen}$ stored in the retrieval dictionary, and $D(q, C_{MinClass})$ is a distance between the retrieval pattern q and $C_{MinClass}$.

15. A retrieval system according to claim 1, wherein the retrieval range decision unit obtains a retrieval range of the clusters, decides whether the learned patterns belonging to each of the clusters in the retrieval range are required to be retrieved, and obtains a retrieval range of the learned patters belonging to the cluster required to be retrieved.

16. The retrieval system according to claim 15, wherein the retrieval range decision unit sets the retrieval range of clusters to include clusters satisfying the following formula:

$$D(C_{MinClass}, C_i) < D(q, C_{MinClass}) + D_{MinP} + R_i,$$

where $D(C_{MinClass}, C_i)$ is a distance between the cluster $C_{MinClass}$ and a cluster $C_i$, $D(q, C_{MinClass})$ is a distance between a retrieval pattern q and $C_{MinClass}$, $D_{MinP}$ is the minimum distance obtained on the way of detection between the retrieval pattern and the learned pattern, and $R_i$ is the radius stored in the retrieval dictionary of the cluster $C_i$.

17. The retrieval system according to claim 15, wherein the retrieval range decision unit determines that the learned patterns belonging to the cluster are required to be retrieved if a formula, $D(q, C_i) < D_{MinP} + R_i$ is satisfied in case a distance $D(q, C_i)$ between the retrieval pattern q and the cluster $C_i$ in the range in which clusters are retrieved is calculated when it is decided whether the learned patterns belonging to each of the clusters in the retrieval range are required to be retrieved.

18. The retrieval system according to claim 15, wherein the retrieval range decision unit sets the retrieval range of the learned patterns to include all the learned patterns that satisfy a formula, $D(p, C_i) > D(q, C_i) - D_{MinP}$ if the distance stored in the retrieval dictionary from a learned pattern p belonging to the cluster $C_i$ to the representative of the cluster $C_i$ is $D(p, C_i)$.

19. A retrieval method of executing pattern retrieval, comprising the steps of:

classifying the learned patterns into plural clusters, and generating a retrieval dictionary using the clusters;

based on clusters in a defined region between a couple of spheres having radiuses smaller and larger respectively, than a distance from a central cluster that locates near the center of a multidimensional space to an input retrieval pattern, detecting a cluster nearest to the retrieval pattern beginning with clusters in the defined region from among the clusters in the multidimensional space utilizing the retrieval dictionary;

comparing each of the learned patterns belonging to the nearest cluster with the retrieval pattern and detecting a learned pattern at a predetermined distance from the retrieval pattern;

deciding a retrieval range using the detected learned pattern and the retrieval dictionary; and retrieving the retrieval pattern among the learned patterns in the retrieval range.

20. A retrieval method according to claim 19, wherein the clusters are selected by cluster numbers stored in the retrieval dictionary, distances between a representative of each of the selected clusters and the retrieval pattern are calculated, a cluster near to the retrieval pattern is obtained and a range for comparison of clusters is reduced for detecting the nearest cluster.

21. A computer readable recording medium that records a retrieval program for instructing a computer to execute pattern retrieval, the retrieval program instructs the computer to function comprising the steps of:

classifying learned patterns into plural clusters, and generating a retrieval dictionary using the clusters;

based on clusters in a defined region between a couple of spheres having radiuses smaller and larger respectively, than a distance from a central cluster that locates near the center of a multidimensional space to an input retrieval pattern, detecting a cluster nearest to the retrieval pattern beginning with clusters in the defined region from among the clusters in the multidimensional space utilizing the retrieval dictionary;

comparing each of the learned patterns belonging to the nearest cluster with the retrieval pattern and detecting a learned pattern at a predetermined distance from the retrieval pattern;

deciding a retrieval range using the detected learned pattern and the retrieval dictionary; and retrieving the retrieval pattern among the learned patterns in the retrieval range.

* * * * *